United States Patent
Chun et al.

(10) Patent No.: US 9,707,536 B2
(45) Date of Patent: Jul. 18, 2017

(54) REACTOR COMPONENTS

(71) Applicants: ChangMin Chun, Annandale, NJ (US); Frank Hershkowitz, Basking Ridge, NJ (US); Paul F. Keusenkothen, Houston, TX (US); Robert L. Antram, Warrenton, VA (US)

(72) Inventors: ChangMin Chun, Annandale, NJ (US); Frank Hershkowitz, Basking Ridge, NJ (US); Paul F. Keusenkothen, Houston, TX (US); Robert L. Antram, Warrenton, VA (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 148 days.

(21) Appl. No.: 13/740,496

(22) Filed: Jan. 14, 2013

(65) Prior Publication Data
US 2013/0251608 A1    Sep. 26, 2013

Related U.S. Application Data

(60) Provisional application No. 61/613,141, filed on Mar. 20, 2012.

(51) Int. Cl.
*B01J 19/02*   (2006.01)
*B32B 18/00*   (2006.01)
(Continued)

(52) U.S. Cl.
CPC .............. *B01J 19/02* (2013.01); *B32B 18/00* (2013.01); *C04B 35/505* (2013.01); *C04B 38/0006* (2013.01); *C10G 9/203* (2013.01); *B01J 2219/00876* (2013.01); *B01J 2219/0281* (2013.01); *C04B 2235/3206* (2013.01); *C04B 2235/3208* (2013.01);
(Continued)

(58) Field of Classification Search
CPC ........ B01J 2219/0087; B01J 2219/0281; B01J 8/087; B01J 19/18; B01J 19/2415; B01J 2219/00876; B01J 19/02; F27B 17/00
USPC .................... 422/619, 600, 129, 78
See application file for complete search history.

(56) References Cited

U.S. PATENT DOCUMENTS 2,319,679 A    5/1943   Hasche et al.
2,678,339 A    5/1954   Harris
(Continued)

FOREIGN PATENT DOCUMENTS

WO    2011/062775    5/2011
WO    2012/099680    7/2012

OTHER PUBLICATIONS

Nait-Ali et al., "Preparation and thermal conductivity characterization of highly porous ceramics", Journal of the European Ceramic Society, Elsevier Science Publishers, Barking, Essex, GB, vol. 27, No. 2-3, Nov. 19, 2007, pp. 1345-1350.
(Continued)

*Primary Examiner* — Dennis M White
*Assistant Examiner* — Bryan Kilpatrick

(57) ABSTRACT

The present disclosure relates to insulation components and their use, e.g., in regenerative reactors. Specifically, a process and apparatus for managing temperatures from oxidation and pyrolysis reactions in a reactor, e.g., a thermally regeneratating reactor, such as a regenerative, reverse-flow reactor is described in relation to the various reactor components.

22 Claims, 7 Drawing Sheets

(51) Int. Cl.
*C10G 9/20* (2006.01)
*C04B 35/505* (2006.01)
*C04B 38/00* (2006.01)

(52) U.S. Cl.
CPC .............. C04B 2235/3217 (2013.01); *C04B 2235/3224* (2013.01); *C04B 2235/3227* (2013.01); *C04B 2235/3229* (2013.01); *C04B 2235/3232* (2013.01); *C04B 2235/3239* (2013.01); *C04B 2235/3241* (2013.01); *C04B 2235/3244* (2013.01); *C04B 2235/3251* (2013.01); *C04B 2235/3256* (2013.01); *C04B 2235/3258* (2013.01); *C04B 2235/3262* (2013.01); *C04B 2235/3272* (2013.01); *C04B 2235/3275* (2013.01); *C04B 2235/3279* (2013.01); *C04B 2235/3418* (2013.01); *C04B 2235/9607* (2013.01); *C04B 2237/34* (2013.01); *C04B 2237/343* (2013.01); *C04B 2237/348* (2013.01)

(56) References Cited

U.S. PATENT DOCUMENTS

| 2,692,819 | A | 10/1954 | Hasche et al. |
| 2,823,027 | A | 2/1958 | Coberly |
| 3,024,094 | A | 3/1962 | Coberly |
| 3,093,697 | A | 6/1963 | Kasbohm et al. |
| 7,491,250 | B2 | 2/2009 | Hershkowitz et al. |
| 7,544,852 | B2 | 6/2009 | Stell et al. |
| 7,815,873 | B2 | 10/2010 | Sankaranarayanan et al. |
| 7,943,808 | B2 | 5/2011 | Hershkowitz et al. |
| 7,976,797 | B2 | 7/2011 | Chun et al. |
| 8,025,094 | B2 | 9/2011 | Janz et al. |
| 8,278,231 | B2 | 10/2012 | Chun et al. |
| 8,399,372 | B2 | 3/2013 | Chun et al. |
| 8,450,552 | B2 | 5/2013 | Hershkowitz et al. |
| 8,512,663 | B2 | 8/2013 | Chun et al. |
| 2003/0109372 | A1 | 6/2003 | Hasegawa et al. |
| 2008/0142409 | A1 | 6/2008 | Sankaranarayanan et al. |
| 2008/0300438 | A1 | 12/2008 | Keusenkothen et al. |
| 2009/0008292 | A1 | 1/2009 | Keusenkothen et al. |
| 2009/0250377 | A1* | 10/2009 | Chun et al. .................. 208/113 |
| 2010/0126907 | A1* | 5/2010 | Chun et al. .................. 208/123 |
| 2010/0130803 | A1 | 5/2010 | Keusenkothen et al. |
| 2010/0292523 | A1 | 11/2010 | Hershkowitz et al. |
| 2011/0008227 | A1* | 1/2011 | Sceats et al. .................. 423/177 |
| 2011/0011768 | A1 | 1/2011 | Keusenkothen |
| 2011/0120853 | A1 | 5/2011 | Chun et al. |

OTHER PUBLICATIONS

W.R. McMahon et al., "High temperature spectral emmisivity of yttrium, samarium, gadolinium, erbium and lutetium oxides", IS-578, Metals, Ceramics, and Materials, Jan. 1, 1963, pp. 4-48.

Neuer, "Spectral and Total Emissivity Measurements of Highly Emmitting Materials", International Journal of Thermodynamics, vol. 16, No. 1, pp. 257-265 (1995).

Angelescu et al., "Thermal conductivity reduction—Basic Requirements of Performance Refractory Lining", Metalurgia International, vol. XV, No. 8, pp. 48-54 (2010).

Chekhovskoi et al., "Thermal conductivity of yttrium oxide", Refractories and Industrial Ceramics, vol. 10, Nos. 5-6, p. 323 (1969).

Predeep et al., "Effective Thermal Conductivity and Thermal Diffusivity of Some Rare Earth Oxides", Physica Scripta, vol. 55, pp. 634-636 (1997).

Mogilenskii et al., "High-Density Refractory Products from Fused Yttrium Oxide", Refractories and Industrial Ceramics, vol. 18, Nos. 11-12, pp. 700-702 (1977).

Curtis, "Properties of Yttrium Oxide Ceramics", Journal of the American Ceramic Society, vol. 40, Issue 8, pp. 274-278, Aug. 1957.

Mullinger et al., Industrial and Process Furnaces: Principles, Design, and Operation, Chapters 4, 6, 11, and 12 (2008).

Uzberg et al., "Some Properties of Materials Produced from Yttrium Oxide", Refractories and Industrial Ceramics, vol. 18, Nos. 7-8, pp. 428-433 (1978).

Zhou et al., "A new thermal-shock-resistance model for ceramics: Establishment and validation", Materials Science & Engineering, pp. 272-276, May 31, 2005.

* cited by examiner

REACTOR COMPONENTS

CROSS-REFERENCE TO RELATED APPLICATIONS

The present application is related to, and claims priority to, U.S. Application Ser. No. 61/613,141, filed on Mar. 20, 2012 and entitled, "Reactor Components," the disclosure of which is hereby incorporated by reference herein.

FIELD OF THE INVENTION

The present disclosure relates to insulation components and their use, e.g., in reactors. The present invention encompasses advanced materials, methods, and apparatus useful in regenerative pyrolysis reactors, which may be used for pyrolyzing or cracking hydrocarbons. In particular, the present invention relates to advanced use of materials, apparatus, and methods suitable for use in cracking hydrocarbon feeds in a high-severity, regenerative pyrolysis reactor.

BACKGROUND OF THE INVENTION

Pyrolysis reactors may be utilized to pyrolyzing or cracking hydrocarbons. These pyrolysis reactors may include regenerative processes that perform cycles, which are either symmetric (same chemistry or reaction in both directions) or asymmetric (chemistry or reaction changes with steps in the cycle). Examples of these reactors and the associated processes are described in U.S. Pat. Nos. 2,319,679; 2,678,339; 2,692,819; 3,024,094; 3,093,697; and 7,943,808. As one of the steps in the cycle, combustion can be used for regenerating reactors to perform cyclic, high temperature chemistry.

The process typically involves a heating step (e.g., regeneration step) and a pyrolysis step in different portions of a cycle. The heating step includes exothermic reactions, e.g., by conducting fuel and oxidant to a reaction zone, combusting the fuel and oxidant, and then conducting the combustion products away from the reaction zone. During the pyrolysis step, a feed containing hydrocarbons is conducted through the reaction zone, thereby pyrolysing the hydrocarbons in the feed and conveying heat from a reactor bed or other source. Some regenerative pyrolysis reactors deliver fuel and/or oxidant directly to the combustion zone without having that stream pass through reactor beds that preheat the stream. The fuel and/or oxidant is typically introduced via nozzles, distributors, or burners that penetrate the reactor using means generally perpendicular to the reaction flow direction and usually through the reactor vessel side wall. For example, during the heating step in a conventional Wulff cracking furnace, air flows axially through the regenerative bodies, and fuel is introduced via nozzles that penetrate the side of the reactor, to combine with air (combusting and releasing heat) in an open region between regenerative bodies.

In these systems, the reactor may include various components to manage the flow of streams (e.g., process-flow components) and may include insulating materials (e.g., insulation components). These insulating components typically involve materials, such as alumina or zirconia. As an example, U.S. Pat. No. 2,823,027 teaches the use of SiC, alumina or zirconia reactor components surrounded by a lining of insulation inside a steel vessel. This reference describes that the use of tile, which are formed of a material selected from the group which includes silicon carbide and aluminum oxide. These materials have a relatively high heat storage and heat conductive capacity and can be subjected to temperatures in the neighborhood of 3000° F. (1649° C.) for long periods without damage. Other refractories may include magnesium oxide, zirconium oxide, or high temperature porcelain. However, the high temperatures and process stresses can exceed the long term viability of most conventional component materials, including conventional refractory ceramics. In addition to component physical and thermal performance considerations, component chemical inertness and crystalline stability are also considerations that should be considered.

As the presence of carbon from the hydrocarbon in a feed and potential presence of oxygen present combustion streams may result in premature ceramic corrosion, chemical stability may also present certain challenges. Many prior art ceramic materials that are relatively inert at lower temperatures become susceptible to chemical degradation, ceramic corrosion, and/or crystalline alteration at higher temperatures, leading to premature degradation, and/or process interference such as by generation of unacceptable levels of contaminants in the process. Exemplary chemically and/or thermally unstable ceramics include, but are not limited to certain borides, carbides, and nitrides. Similarly, while zirconia is commonly used in certain refractory ceramics, it undergoes a crystalline change between moderately high temperatures and severely high temperatures in the way its atoms are stacked (polymorphic transformation).

Accordingly, the configuration of reactor components, such as process-flow components and insulation components, within pyrolysis reactors may be utilized to enhance the operation of a pyrolysis reactor, while providing thermal and chemical stability. That is, a ceramic composition and configuration of ceramic materials that resists or avoids carbon permeation, carburization, and/or oxide-carbide corrosion is needed. The desired materials should concurrently provide and maintain the needed structural integrity, crystalline stability, relatively high heat transfer capability, and chemical inertness required for large scale, commercial applications, particularly with respect to hydrocarbon pyrolysis.

SUMMARY OF THE INVENTION

In one or more embodiments, a hydrocarbon pyrolysis reactor is described. The reactor comprises a process-flow component and an insulation component adjacent to the process-flow component. The insulation component comprises an oxide, the oxide having: i) a bulk thermal conductivity in the dense phase ≤5 W/m·K at temperatures in the range of 800° C. to 1600° C.; ii) a porosity of ≥30 vol % based on the volume of the insulation component; iii) a melting point of no less than 2060° C.; and iv) which remains in oxide form when: a) exposed to a first gas at a first temperature, the first gas having i) an oxygen partial pressure of $1 \times 10^{-15}$ bar (absolute), and ii) a carbon partial pressure greater than that at which zirconium oxide changes phase to zirconium carbide at the first temperature; wherein the first temperature is less than that of zirconium's triple point at the oxygen partial pressure; and/or b) exposed to a second gas having an oxygen partial pressure at a second temperature, the second temperature being greater than or equal to that of zirconium triple point at the oxygen partial pressure. The reactor may be a thermal pyrolysis reactor, such as a reverse flow regenerative reactor, that subjects the components to thermal pyrolysis conditions.

In one or more embodiments, a hydrocarbon conversion method is described. The method includes providing a reactor having a process-flow component; and an insulation component adjacent to the process-flow component; wherein the insulation component comprises an oxide, the oxide having: i) a bulk thermal conductivity in the dense phase ≤5 W/m·K at temperatures in the range of 800° C. to 1600° C.; ii) a porosity of ≥30 vol % based on the volume of the insulation component; iii) a melting point of no less than 2060° C.; and iv) which remains in oxide form when: a) exposed to a first gas at a first temperature, the first gas having i) an oxygen partial pressure of $1\times10^{-15}$ bar, and ii) a carbon partial pressure greater than that at which zirconium oxide changes phase to zirconium carbide at the first temperature; wherein the first temperature is less than that of zirconium's triple point at the oxygen partial pressure; and/or b) exposed to a second gas having an oxygen partial pressure at a second temperature, the second temperature being greater than or equal to that of zirconium triple point at the oxygen partial pressure; and exposing a pyrolysis feed to thermal pyrolysis at a peak pyrolysis gas temperature ≥1400.0° C. to produce a reactor product that comprises $C_2$ unsaturates. The pyrolysis feed may comprise >10 wt % hydrocarbon based on the total weight of the pyrolysis feed, and wherein the pyrolysis feed has a hydrogen ($H_2$) gas to carbon (carbon atoms in feed hydrocarbon molecules) molar ratio in the range of 0.1 to 5.

Further still, in one or more embodiments, a regenerative reactor system is described. The system includes a first reactor bed and a second reactor bed in flow communication with the first reactor bed. The system includes at least one insulation layer adjacent to the first reactor bed and a second reactor bed; wherein the insulation layer has a bulk thermal conductivity in the dense phase ≤5 W/m·K at temperatures in the range of 800° C. to 1600° C., or porosity in the range of 30% and 75%, based on the volume of the insulation layer. The at least one insulation layer may comprise a plurality of insulation bricks disposed between an outer shell and the first reactor bed and the second reactor bed, and/or the at least one of the plurality of insulation bricks may comprise >70 wt % yttria and at least one of the plurality of insulation bricks comprise one or more of zirconium, alumina and combinations thereof. Also, the system may include a fluid barrier layer disposed between at least one insulation layer and the first reactor bed and the second reactor bed, wherein the fluid barrier layer has porosity in the range of 0% to 10% based on the volume of the fluid barrier layer. This system may also include an outer shell comprising >50 wt % carbon steel. Further, the plurality of insulation bricks may be configured to form two or more layers between the outer shell and one of first reactor bed and the second reactor bed.

In one or more embodiments, the components may have different properties. For example, the process-flow component may have a porosity in the range of 1 vol % and 28 vol %, based on the volume of the process-flow component; and the insulation component may have a porosity in the range of 30 vol % and 75 vol %, 30 vol % and 50 vol %, and/or 50 vol % and 75 vol %, based on the volume of the insulation component. The insulation component may have a bulk thermal conductivity in the dense phase ≤4 W/m·K, ≤3 W/m·K or ≤2 W/m·K when the insulation component has a temperature in the range of 800° C. to 1600° C. The insulation component may have emissivity in the dense phase <0.35, <0.3 at 1000° C. The insulation component may include a first surface and a second surface, wherein the second surface has one or more of a porosity >2% larger than the first surface, a thermal conductivity >2% larger than the first surface, and/or an emissivity >2% larger than the first surface.

Further, in one or more embodiments, the insulation component may include different configurations. For example, a plurality of insulation bricks may be utilized and configured to form two or more layers between a process-flow component and an outer shell. The plurality of insulation bricks may include at least one of yttria, an yttrium containing compound, and combinations thereof. Also, the insulation component may include at least one of the plurality of insulation bricks that comprises >50 wt % yttria and at least one of the plurality of insulation bricks comprises one or more of zirconium, alumina, and combinations thereof. In addition, a fluid barrier layer may be utilized that has a porosity in the range of 0 vol % to 10 vol %, based on the volume of the fluid barrier layer disposed between the plurality of insulation bricks and the process-flow component. The insulation component of any of the preceeding embodiments can be ceramic, e.g., vitreous or non-vitreous ceramic.

Figure 1A:
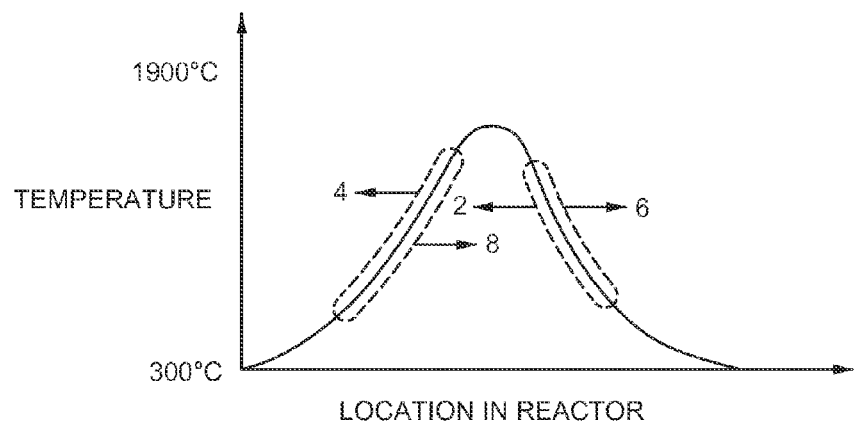
FIGS. 1A and 1B schematically illustrate thermal regeneration in a reverse flow regenerative reactor and associated temperature profile.

Although the invention is described in terms of a thermal pyrolysis process for producing $C_2$ unsaturates, the invention is not limited thereto. In other words, to the extent that the following detailed description is specific to a particular embodiment or a particular use, this is intended to be illustrative only, and is not to be construed as limiting the scope of the invention. On the contrary, it is intended to cover all alternatives, modifications and equivalents that may be included within the spirit and scope of the invention, as defined by the appended claims.

DETAILED DESCRIPTION OF THE PREFERRED EMBODIMENTS

The present invention is based in part on the observation that reactor components, such as insulation and process-flow components, are utilized in different zones within a reactor and exposed to different process conditions. The process-flow components may include components that manage the flow of process fluids through the internal zones within the reactor, while the insulation components may include components that inhibit the transfer of heat from the interior of the reactor to locations external to the reactor. These insulation components may also inhibit the flow of process fluids to locations external to the reactor. Exemplary reactor components may include those described in U.S. Patent Application Publication Nos. 2007-0191664; 2010-0292522; 2010-0290978; and 2010-0292523; which are hereby incorporated by reference. As an example, the process-flow components may include mixing-distributor means, reactor beds, inlet, and/or outlet means (e.g., valves and/or spargers), conduits and the like. The insulation components may comprise bedding or packing material, tiles, flow barriers, which may be formed from glass, ceramic, (including, e.g., alumina, silica, yttria, zirconia, etc.) and mixtures thereof.

For certain locations in the reactor, the reactor components may be sensitive to (a) environmental operating conditions and/or (b) temperature operating conditions. For certain types of reactors, such as regenerative reactors, for example, it has been discovered that insulation components and process-flow components can be varied with different compositions and properties, which are not the same as all locations in the reactor by utilizing insulation components (and/or process-flow components) having compositions and properties tailored to the location at which the component is utilized in the reactor, to generally reduce the reactor's sensitivity to process operating conditions.

For example, the reactor components may be exposed to different temperature operating conditions at different locations. These temperature operating conditions may include withstanding long term exposure to temperatures $\geq 1200°$ C., preferably $\geq 1500°$ C., more preferably $\geq 1700°$ C., and even more preferably $\geq 2000°$ C., for operating margin and large temperature swings. Accordingly, the materials utilized for the reactor components may be selected to withstand certain temperatures, while maintaining integrity and functionality. That is, the different materials may be utilized within certain locations based on the exposure to certain temperatures, which may include utilizing different materials depending on the location. As an example, the material used for an insulation component may be ceramic (such as yttria), alumina, and/or other refractory material capable of withstanding temperatures within the pyrolysis reactor. As a specific example, the process-flow components and insulation components near the zone where exothermic reactions are performed may include reactor components comprised of yttria. Specifically, these components may be high-yttria refractory materials comprising yttria ($Y_2O_3$) greater than 50 wt %, preferably greater than 70 wt %, more preferably greater than 90 wt %, most preferably greater than 95 wt % of the total weight of the refractory product and having a pyrometric cone equivalent of >1600° C. Other reactor components may include metal or other ceramics, which may be located near the ends of the reactor or outside of a certain temperature range. These materials may include yttria, which may include a multi-modal formulation for stabilized zirconia to create a durable porosity (30 vol % to 45 vol % based on the volume of the component) and/or a dual-oxide composition that combines small particle stabilizer with coarse-particle yttria.

Further, the reactor components at certain specific locations may be exposed to different environmental conditions, as well. For instance, the thermal pyrolysis in a regenerative pyrolysis reactor may include a regeneration step (e.g., heating or oxidation step) along with a pyrolysis step. In such processes, the process-flow components and/or certain insulation components may be exposed to oxidation environments and/or reducing environments. As an example, the oxidation environment may result from combustion of fuel and air, while the reducing environment may result from hydrocarbon pyrolysis. Accordingly, the reactor components have to be chemically stable within the reactor.

Moreover, the materials utilized for the reactor components may be selected to enhance certain characteristics or properties. For instance, the certain reactor components used in a regenerative reactor may have preferred porosity, thermal conductivity, and/or emissivity. The process-flow component may have a porosity <5 volume percent (vol %), <2 vol %, <1 vol %, based on the volume of the process-flow component, or even substantially no porosity in some embodiments. Other process-flow components may have a porosity of >2 vol %, >5 vol %, >8 vol %, >10 vol %, or >15 vol %, but may have porosity <28 vol %, <25 vol %, <20 vol %, or <15 vol %, based upon the bulk volume of the component. The insulation components may have a porosity >30 vol %, >35 vol %, or in a range of 30 vol % to 75 vol %, 35 vol % to 60 vol %, 30 vol % to 50 vol %, 50 vol % to 75 vol %, 51 vol % to 70 vol %, 41 vol % to 50 vol %, or 40 vol % to 50 vol %, based on the volume of the insulation component. As a specific example, the process-flow components may have a porosity less than or equal to ($\leq$) 28 vol %, in the range of 1 vol % to 20 vol %, in the range of 5 vol % to 15 vol % based on the volume of process-flow component, while the insulation components may have a porosity greater than or equal to ($\geq$) 30 vol %, in the range of 30 vol % to 75 vol %, in the range of 40 vol % to 50 vol % based on the volume of the insulation component.

Similarly, the process-flow components may have higher bulk thermal conductivities, while the insulation components may have lower bulk thermal conductivities. In particular, the bulk thermal conductivity for an insulation component may preferably be <5 watts per meter ° K (W/m·K), $\leq$4 W/m·K, $\leq$3 W/m·K, or even $\leq$2 W/m·K, in the dense phase for temperatures >600° C., in the range of 800° C. to 2000° C., in the range of 900° C. to 1800° C., or in the range of 1000° C. to 1800° C. The insulation component may not be in the dense phase when utilized as it may have one of the porosities noted above. Finally, the reactor components may have a preferred emissivity, which may be higher for process-flow components and lower for insulation components. As an example, the emissivity for a process-flow component may be >0.45 and the emissivity for an insulation component may preferably be $\leq$0.45. In particular, an insulation component may be exposed to higher temperatures, such as $\geq$700° C., $\geq$1000° C., or $\geq$1400° C., and be formed from a material having emissivity <0.65, <0.55, <0.45, <0.35, or <0.3 at 1000° C. These aspects along with other variations are discussed further below.

One such reactor and materials will now be described in more detail, but the present invention is not limited thereto, and this description is not meant to foreclose other embodiments within the broader scope.

I. Materials

In one or more embodiments, the reactor has various reactor components (e.g., process-flow components and/or insulation components) that may be formed from different materials. These materials may be preferred for different zones within a reactor system, which results in different compositions and/or properties based on the conditions for that location and the intended use at that location. For instance, the materials for certain components may be formed to maintain integrity, functionality, and withstand long term exposure to temperatures $\geq$1200° C., preferably $\geq$1500° C., more preferably $\geq$1700° C., and even more preferably $\geq$2000° C. for operating margin.

For example, the reactor components may be exposed to different heat profiles. For example, the exemplary embodiment of a reverse-flow regenerative reactor utilized for a two-step asymmetric cycle reaction is depicted in FIG. 1B with the temperature profile depicted in FIG. 1A, which are discussed together for simplicity. The system, which is described further below, comprises two reactors: a first reactor 7 and a second reactor 1. The reactors may be surrounded by one or more insulating components 20, which may be divided into different bricks or tiles. Accordingly, the materials utilized for these different components may involve different properties based on the function and location within the reactor, as noted in FIGS. 1A and 1B. That is, the different reactor components may experience different temperatures, as noted in FIG. 1A.

As an example, at the ends of the reactor, the reactor components may be exposed to temperatures below 900° C., while reactor components in the reactors 1 and 7 near the mixing and mixing zone 13 may be exposed to temperatures greater than 900° C. and may even be in excess of 2000° C. for certain portions of the reactor. Similarly, the insulation components may vary based on the insulation component location (e.g., near the hot zones) or based on the layering of the insulation component (e.g., first layer adjacent to bed or second or third layer disposed adjacent to the external shell or housing for the reactor). Accordingly, certain thermal related properties (e.g., emissivity, thermal conductivity, etc.) may be adjusted in insulation components to enhance the operation of the process.

The materials utilized for reactor components is typically based on at least one oxide of one or more elements selected from Groups IIa, IIIb, IVb, Vb, VIIb, VIIb, VIII, Ib, IIb, IIIa, and Va of the Periodic Table (Merck Index, 1996). Optionally, the materials are based on oxides of elements from one or more of Groups Ma, IVa, IIa, VIb, and IVb of the Periodic Table, e.g., one or more of six base oxides of aluminum (alumina, $Al_2O_3$), silicon (silica, $SiO_2$), magnesium (magnesia, MgO), calcium (calcia, CaO), chromium (chromia, $Cr_2O_3$), and zirconium (zirconia, $ZrO_2$), including compounds between them; such as in combination with carbon. In addition to carbon and silicon carbide (SiC), small amount of boron carbide ($B_4C$) and nitrides ($Si_3N_4$, BN) are added for special applications.

Typically, zirconia is used when the material has withstood extremely high temperatures, but it tends to transform into zirconium carbide (ZrC) in highly carburizing environments. Magnesia and calcia can be applied to high temperature process environments, but they tend to evaporate in reducing environments. Chromia is unstable at temperatures above about 1000° C. and it tends to vaporize by the following reaction: $Cr_2O_3$ (s)+$O_2$ (g)=$CrO_3$ (g). Silicon carbide and carbon (graphite) are two other refractory materials used in some very severe temperature conditions, but they cannot be used in contact with oxygen-containing gases, as they oxidize and burn. Similarly, the application of silica-containing refractory material in reducing atmospheres is limited by loss of silica. Volatilization in vacuum or an inert gas is known to occur by the reaction: $2SiO_2$ (s)=2SiO (g)+$O_2$ (g); or in hydrogen by the reaction: $SiO_2$ (s)+$H_2$ (g)=SiO (g)+$H_2O$. The amount of silica loss can be substantial at high temperatures greater than 1300° C. However, these materials have chemical and temperature challenges when exposed to thermal pyrolysis process operating conditions.

Accordingly, certain zones of the reactor may utilize reactor components formed from the above mentioned materials, but others may involve other materials, such as yttria. Yttria-based refractory material provides high refractoriness having a pyrometric cone equivalent of >1600° C. Yttria is non-volatile in reducing atmospheres and chemically inert in carburizing environments. High-yttria refractory material contains yttria (e.g., $Y_2O_3$) greater than (>) 50 wt %, >70 wt %, >90 wt %, or >95 wt % of the total weight of the refractory component. Various raw materials can be used to manufacture high-yttria refractory products, which include sintered yttria, fused yttria grogs, chemically synthesized yttria powder, spray-dried, and calcined granules.

In addition, other materials utilized in the reactor components are described in various applications, such as U.S. Pat. Nos. 7,815,873 and 7,846,401; along with U.S. Patent Application Publication Nos. 2007-0191664; 2009-0008292; 2008-0300438; 2009-0250377; 2010-0126907; 2010-0130803; 2010-0292522; 2010-0290978; 2010-0288617; 2010-0292523; and 2011-0011768, which are each incorporated by reference herein. These other materials may be utilized in zones that are not subjected to operating conditions (e.g., environment or temperatures) that are problematic to these materials. As an example, these materials may be utilized for insulation components and/or process-flow components near or adjacent to the reactor ends. As a result, the physical and chemical properties of reactor components may be selected and varied depending upon the requirements of the process operating conditions (e.g., the environment operating conditions and the temperature operating conditions, etc.). These reactor properties may include density, porosity, hot and cold strength, Young's modulus, thermal capacity, chemical inertness, emissivity, thermal conductivity, temperature stability, especially while under loading, and thermal shock resistance. Each of these properties may vary for different components, such as between process-flow components and insulation components or between same type of component. These properties, such as grain size and distribution and the resultant porosity amount and size distribution influence one or more of these properties, including density, hot and cold strengths, thermal shock resistance and thermal conductivity, can be influenced by one skilled in the material sciences. Also, these properties can be further altered by the intentional formation of added porosity.

Additional information regarding specific properties may be found in other sources, such as Neuer, "Spectral and Total Emissivity Measurements of Highly Emmitting Materials", International Journal of Thermodynamics, Vol. 16, No. 1, pages 257-265 (1995); Nait-Ali et al., "Preparation and thermal conductivity characterization of highly porous ceramics comparison between experimental results, analytical calculations and numerical simulations", Journal of European Ceramic Society, 27, pages 1345-1350 (2007); Angelescu et al., "Thermal conductivity reduction—Basic Requirements of Performance Refractory Lining", Metalurgia International, Vol. XV, No. 8, pages 48-54 (2010); Chekhovskoi et al., "Thermal conductivity of yttrium oxide", Refractories and Industrial Ceramics, Vol. 10, Nos. 5-6, page 323 (1969); Predeep et al., "Effective Thermal Conductivity and Thermal Diffusivity of Some Rare Earth Oxides", Physica Scripta, Vol. 55, pages 634-636 (1997); Mogilenskii et al., "High-Density Refractory Products from Fused Yttrium Oxide", Refractories and Industrial Ceramics, Vol. 18, Nos. 11-12, pages 700-702 (1977); Curtis, "Properties of Yttrium Oxide Ceramics", Journal of the American Ceramic Society, Vol. 40, Issue 8, pages 274-278, August 1957; and Mullinger et al., Industrial and Process Furnaces: Principles, Design, and Operation, Chapters 4, 6, 11, and 12 (2008); McMahon et al., "High temperature spectral emissivity of Yttrium, Samarium, Gadolinium, Erbium and Lutetium Oxides", Atomic Energy IS-578, specifically FIGS. 12 and 17 (1963); Uzberg et al., "Some Properties of Materials Produced from Yttrium Oxide", Refractories and Industrial Ceramics, Vol. 18, Nos. 7-8, pages 428-433 (1978). These documents provide information about certain properties that are discussed further below.

Different properties related to the temperature operating conditions may be influenced to enhance the operation of the system. For instance, the different reactor components may require different thermal properties and/or porosity, which influence certain of these properties based on the temperature profile noted in FIG. 1A. These properties are expressed below in the thermal stability, emissivity, thermal capacity, and thermal conductivity and porosity.

Thermal stability relates to the ability of a material to resist decomposition as a result of changes in temperature. The reactor components (e.g., process-flow components and insulation components) should include materials that are thermally stable at the exposure temperatures. As noted above, these temperatures may vary depending on the specific location that the component is located. Accordingly, various methods may be utilized to determine the thermal stability, which include the American Society of Testing and Materials (ASTM) C71, ISO/R 836, and ISO/R 528. As certain materials do not possess a specific melting point, the measurements may be based on when the material melt or rather soften within a more or less narrow temperature range under standardized conditions of the refractoriness test. Preferably, the insulation components in the hottest part of the reactor are formed from a material that has a melting point of ≥2060° C. or ≥2160° C.

Thermal conductivity relates the ability of a material to transfer heat. The insulation components should include materials that have a low thermal conductivity to hinder or limit the transfer of heat from one material to adjacent components, while the process-flow components may include a material having a higher thermal conductivity to promote the transfer of heat to other regions along the fluid flow. The relation of thermal conductivity versus temperature for various materials are described further in FIG. 2.

Figure 2:
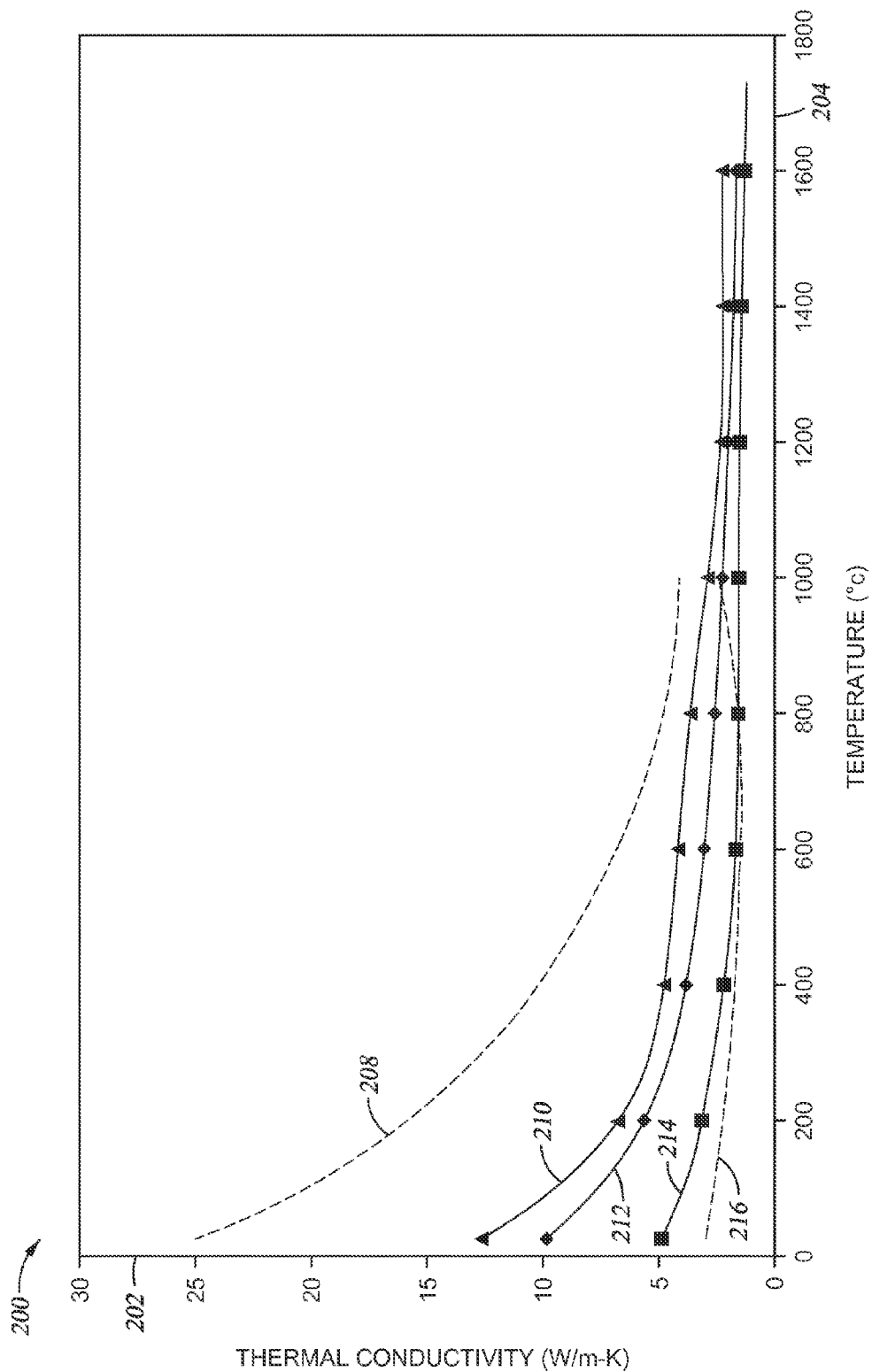
FIG. 2 illustrates test results for materials utilized in reactor components and the associated thermal conductivity at different temperatures.

FIG. 2 illustrates test results for materials that may be utilized in reactor components and the associated thermal conductivity at different temperatures. This figure provides the thermal conductivities for dense alumnia 208 (99%, Grade A-479 made by Kyocera), dense yttria 210, fine yttria 212, coarse yttria 214, and dense zirconia 216. The thermal conductivities are determined by the ASTM E1461, e.g., flash method thermal conductivity, which may be performed by those skilled in the art. In diagram 200, certain values for thermal conductivity in watts per meter ° K (W/m·K) for different materials are shown along the Y-axis 202 for various temperatures (in ° C.) along the X-axis 204. As depicted by these thermal conductivity responses, certain materials provide enhanced thermal conductivities relative to others as the temperature increases. In particular, the dense yttria 210, fine yttria 212, and coarse yttria 214 appear to have lower thermal conductivities at temperatures >1000° C., while dense zirconia 216 and dense alumina 208 appear to have higher thermal conductivities at these higher temperatures. As such, for insulation components that may be exposed to temperatures >1000° C., the material in the insulation components may be substantially yttria, while zirconia and alumina may be preferred for lower temperature regions.

Accordingly, the process-flow components may have higher bulk thermal conductivities, while the insulation components may have lower bulk thermal conductivities. In particular, the bulk thermal conductivity for an insulation component may preferably be ≤5 W/m·K, ≤4 W/m·K, ≤3 W/m·K, or even ≤2 W/m·K in the dense phase for temperatures >600° C., in the range of 800° C. to 2000° C., in the range of 900° C. to 1800° C., or in the range of 1000° C. to 1800° C. The insulation component may not be in the dense phase when utilized as it may have one of the porosities noted above.

Also noted in the FIG. 2 is the effect of porosity on thermal conductivities of yttria materials. The dense yttria 210 is substantially pore-free and has about 99% density (e.g., 1% porosity). The fine yttria 212 contains about 13.2% porosity and the course yttria 214 contained about 23.4% porosity. At a given temperature over the entire temperature range investigated, the thermal conductivity decreases with increasing porosity. It is known that the thermal conductivity of porous ceramics can be approximately expressed as a function of the porosity of the material:

$$k = k_0 \cdot e^{\left(\frac{-1.5 \cdot \varphi}{1-\varphi}\right)}$$

where, $k_0$ is the thermal conductivity of dense ceramics whose porosity is zero; $\varphi$ is the porosity of porous ceramic material. According to this formula, the thermal conductivities of ceramics decreases with increasing porosity. Generally, use of porous ceramics as thermal insulation is beneficial because it provides longer life, uniformity in firing atmosphere, less shrinkage in insulation layer, chemical inertness and fiber-free ceramics. Further, adjusting the porosity to above 30 vol % based on the volume of the insulation component may also enhance the emissivity in insulation components. For insulation components, these pores may be closed cells that do not permit the flow of fluids.

To enhance a specific material, the porosity may be adjusted, which changes certain properties, such as thermal conductivity, along with the change in temperature. Porosity is a measure of the void or empty spaces between grains of a material. It may be referred to as a fraction of the void volume over the total volume. As noted above, a certain amount of porosity is desirable to enhance the strength of the material. The materials used for the reactor components may be provided, for example, in one or more pyrolysis reactors, such as, but not limited to, those reactors having regenerative reactor beds or cores that are useful for carrying out a high temperature chemical reaction. The reactor components may include substantially any suitable geometry, form or shape, such as, but not limited to, spheres, beads, honeycomb materials, tubes, pipes, U-tubes, fluid mixers, nozzles, extruded monoliths, bricks, tiles, reactor trays, tray components, and other refractory components that are exposed to high temperature, and may be used for different purposes. Such reactor components may by design include flow channels, conduits, or other space which may be regarded or referred to as "void volume" through which fluid passes as part of the function of the component. It is understood that such void volume is not considered to be part of the "porosity" of the ceramic material as described herein and the porosity is based on the volume of respective component as described herein. The porosity specified herein is specifically for the matrix or portion of the component that does not carry flow; often referred to as the wall or the solid portion of the component (e.g., process-flow component or insulation component), which is based on the volume of the component. Similarly, references to the volume of the material or component are referring to the ceramic matrix volume, including the porosity therein, and not to the primary fluid conducting channels or void volume. The sustained strength and relative inertness properties of the inventive materials may provide for a wider range of component geometries and function than previously available in the art, again also leading to process improvements. As may be appreciated, the process-flow components tend to prefer lower porosity, while insulation components prefer increased porosity as it is associated with a lessening in thermal conductivity.

In addition, porosity can also be utilized to enhance certain properties, such as control ceramic corrosion. Porosity facilitates small scale matrix flexibility among the matrix grains, while also permitting dissipation of both mechanical and thermal stress concentrations (particularly with respect to arresting crack propagation). Although porosity is related to the high strength and thermal shock resistance of the ceramic materials, increased amounts of porosity (e.g., open pores that are connected to the exterior surfaces) may permit coking and infiltration of carbon within the material, which may lead to localized ceramic corrosion or carbon deposition within the interior of the reactor component. Further, increased porosity may be utilized to limit the transfer of heat from one portion to another portion of the reactor. That is, the porosity include, but are not limited to, increased surface area for heat transfer, increased thermal shock resistance, mitigation of crack propagation, improved flexural strength, etc. Porosity is preferably substantially uniformly dispersed throughout the composition.

Figure 3:
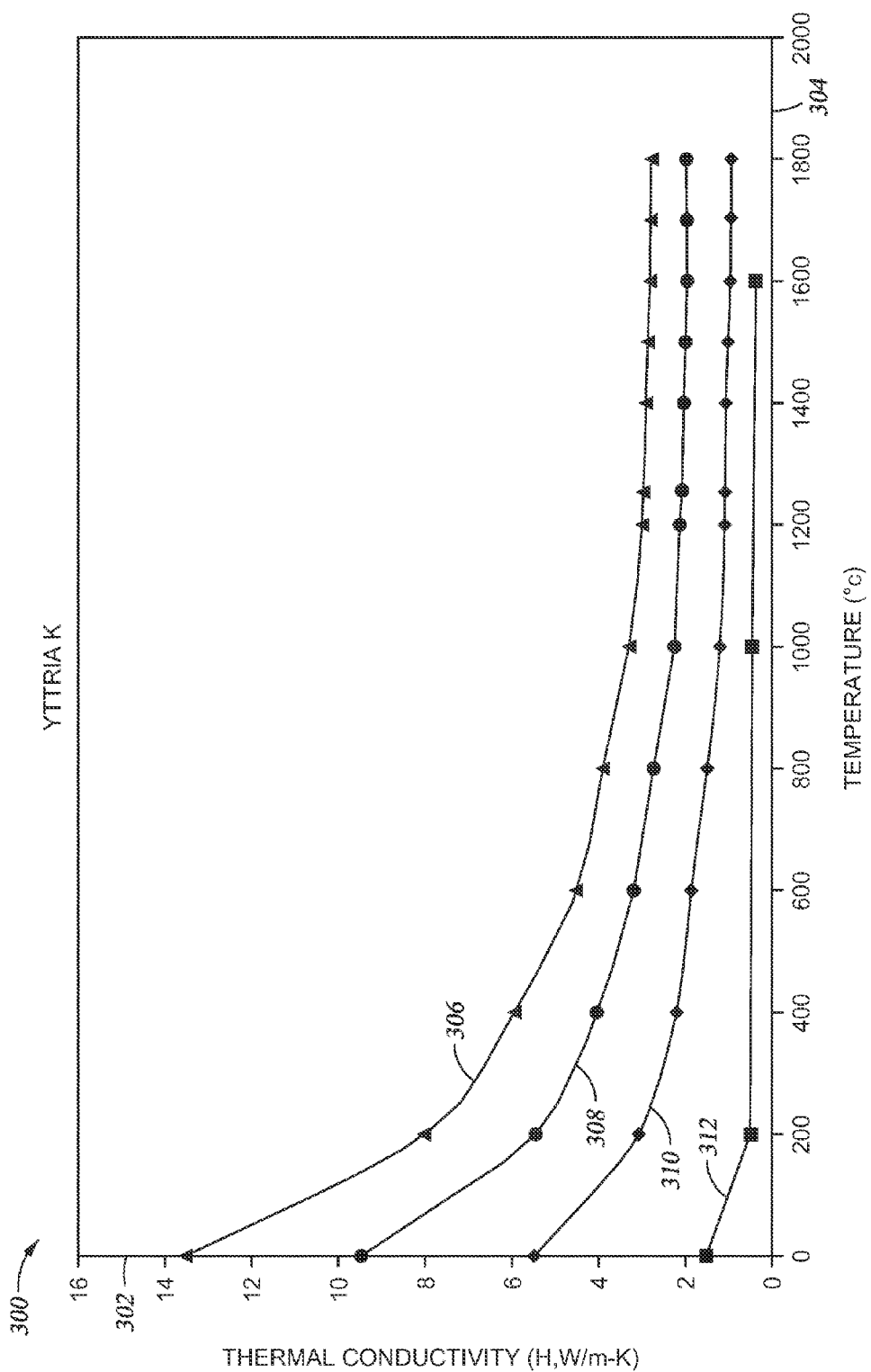
FIG. 3 illustrates test results for materials having different porosities utilized in reactor components and the associated thermal conductivity at different temperatures.

FIG. 3 illustrates test results for materials having different porosities that may be utilized in reactor components and the associated thermal conductivity at different temperatures. This method utilizes the same method as noted in FIG. 2 and porosities are based on the volume of component. In this figure, the thermal conductivity responses for different temperatures are shown for yttria having 1 vol % porosity 306, yttria having 14 vol % porosity 308, yttria having 27 vol % porosity, and yttria having 40 vol % porosity 312. In diagram 300, certain values for thermal conductivity in W/m·K for different materials are shown along the Y-axis 302 for various temperatures (in ° C.) along the X-axis 304. As depicted on these thermal conductivity responses 306-312, certain changes in the porosity of the yttria provide enhanced thermal conductivities relative to others for the different temperature. As such, for insulation components, the higher porosity appears to provide lower thermal conductivities.

Figure 4:
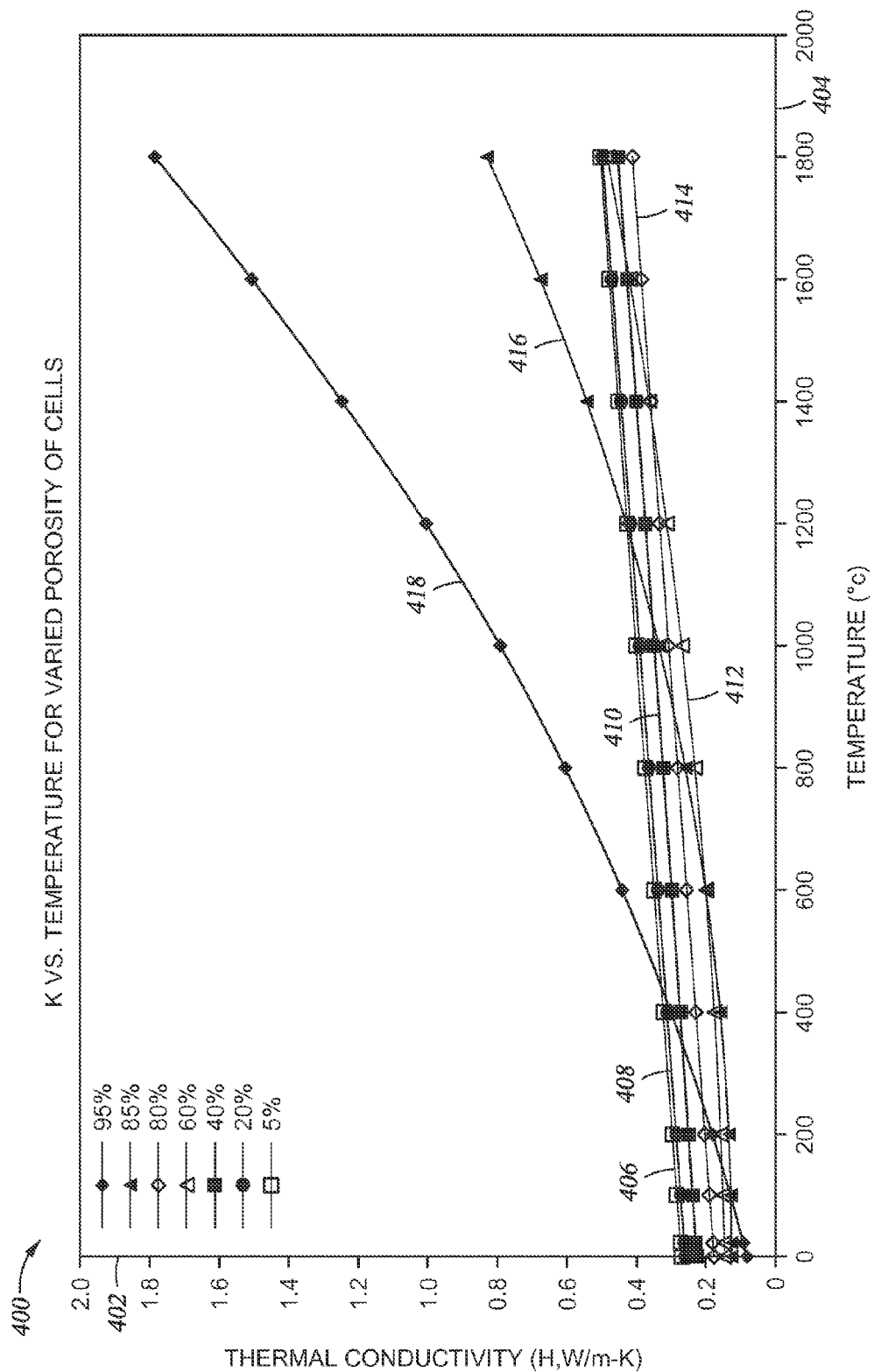
FIG. 4 illustrates test results for materials having different porosities utilized in reactor components and the associated thermal conductivity at different temperatures.

However, certain levels of porosity may degrade the performance of the material. FIG. 4 illustrates some additional test results for materials having different porosities based on the volume of respective components that may be utilized in reactor components and the associated thermal conductivity at different temperatures. In this figure, the material is calsil, and the thermal conductivity responses for different temperatures are shown for calsil having 5 vol % porosity 406, calsil having 20 vol % porosity 408, calsil having 40 vol % porosity 410, calsil having 60 vol % porosity 412, calsil having 80 vol % porosity 414, calsil having 85 vol % porosity 416, and calsil having 95 vol % porosity 418. This data is derived from measured data and predicted data. In diagram 400, certain values for thermal conductivity in W/m·K for different porosities of a calsil material are shown along the Y-axis 402 for various temperatures (in ° C.) along the X-axis 404. As depicted on these thermal conductivity responses, certain materials provide enhanced thermal conductivities relative to others as the temperature increases. In particular, the calsil having 40 vol % porosity 410 and calsil having 60 vol % porosity 412, provide lower thermal conductivities for the temperatures that the reactor may operate, while calsil having 80 vol % porosity 414, calsil having 85 vol % porosity 416 and calsil having 95 vol % porosity 418, appear to have higher thermal conductivities at higher temperatures, such as ≥400° C. for calsil having 95 vol % porosity 418, ≥1000° C. for calsil having 85 vol % porosity 416, and ≥ for calsil having 80 vol % porosity 414. As such, for insulation components that may be exposed to temperatures >1000° C., the material in the insulation components may have a porosity within a certain range, such as in the range of 40 vol % to 80 vol % porosity or in the range of 40 vol % to 60 vol % porosity.

Accordingly, the different reactor components may be utilized with different porosities. As a specific example, the process-flow component may be enhanced by having higher thermal conductivity. The process-flow component may have a porosity <5 vol %, <2 vol %, <1 vol %, or even substantially no porosity in some embodiments. Other process-flow components may have a porosity of >2 vol %, >5 vol %, >8 vol %, >10 vol %, or >15 vol %, but may have porosity <28 vol %, <25 vol %, <20 vol %, or <15 vol %, based upon the bulk volume of the component. The insulation components may have lower thermal conductivity. Accordingly, the insulation component may a porosity >30 vol %, >35 vol % or in a range of 30 vol % to 75 vol %, 35 vol % to 60 vol %, 30 vol % to 50 vol %, 50 vol % to 75 vol %, 51 vol % to 70 vol %, 41 vol % to 50 vol %, or 40 vol % to 50 vol %, based on the volume of insulation component.

In thermal pyrolysis, heat is exchanged via interaction between the surface area of the flow passages and the fluids within the reactor. The heat transfer within the reactor involves convective heat transfer and radiative heat transfer. The radiative heat transfer coefficient increases rapidly within the reactor at temperatures above about 700° C. The increase roughly doubles the overall heat transfer coefficient for every about 300° C. increase in temperature. Accordingly, this heat transfer mechanism may be utilized to further enhance the reactor and its operation, or may be utilized to enhance the material utilized for the insulation components and process flow components.

For certain zones within the reactor, another property that may be utilized for insulation components is emissivity. Emissivity relates to the ability of a material to emit energy via radiation. The process-flow components may include materials that have high emissivity for certain regions that are exposed to higher temperatures, while insulation components may include lower emissivity's to dissipate the heat, which is not stored or utilized for process fluids.

Figure 5:
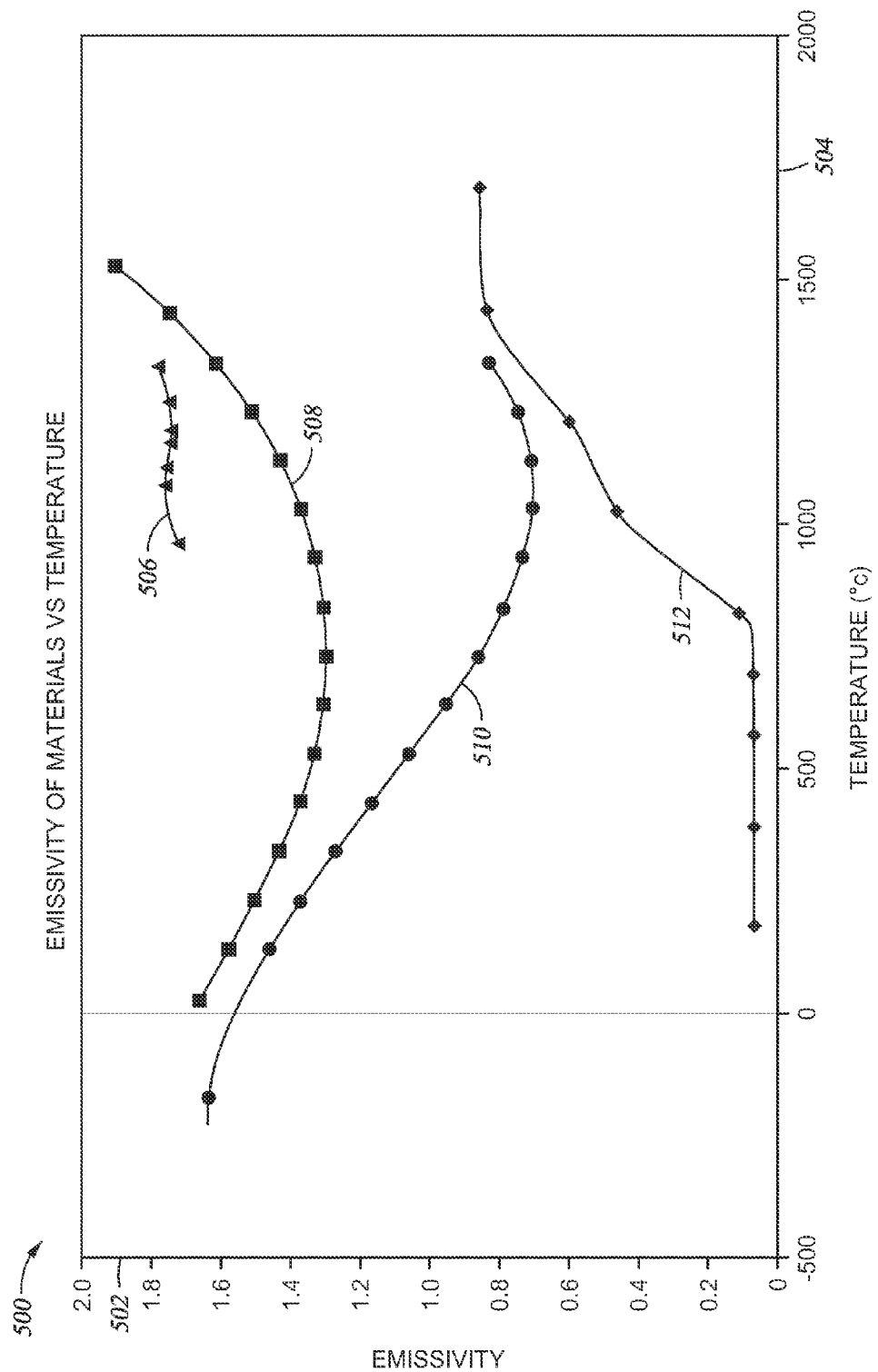
FIG. 5 illustrates results for materials utilized in reactor components and the associated emissivity at different temperatures.

FIG. 5 illustrates some additional results for materials that may be utilized in reactor components and the associated emissivity at different temperatures. In this figure, the emissivity responses for different temperatures are shown for a carbon response 506, an alumina response 508, a zirconia response 510, and a yttria response 512. In diagram 500, certain values for emissivity are shown along the Y-axis 502 for various temperatures (in ° C.) along the X-axis 504. As depicted on the emissivity responses 506-512, certain materials provide enhanced emissivity relative to others as the temperature increases. In particular, the yttria response 512 surprisingly provides lower emissivity for the temperatures that the reactor may operate, while carbon response 506, alumina response 508 and zirconia response 510 appear to have higher emissivity at lower temperatures and increase at temperatures ≥1000° C. While yttria also increases at these higher temperatures, it appears to level off at temperatures ≥1400° C., while the other responses continue to increase at faster rates. By definition, emissivity is the inverse of reflection. Materials with lower emissivities have higher reflection of heat or energy at a given temperature. As such, yttria is a good insulation material, while other materials have higher emissivity when exposed to temperatures >1400° C. Accordingly, the insulation component may preferably be substantially yttria for insulation components that are exposed to these higher temperatures.

As may be appreciated, at the lower temperatures convective heat transfer may dominate radiative heat transfer. Accordingly, the reactor components may have a preferred emissivity, which may be higher for process-flow components and lower for insulation components. As an example, the emissivity for a process-flow component may be >0.45 and the emissivity for an insulation component may preferably be ≤0.45. As an example, zirconia and alumina or other materials may be utilized within certain regions to provide higher thermal conductivity and higher emissivity, which may be useful for process-flow components. However, for insulation components exposed to higher temperatures, such as ≥700° C., ≥1000° C., or ≥1400° C., a material having emissivity <0.65, <0.55, <0.45, <0.35, or <0.3 at 1000° C. may be utilized. As an example, this material may include yttria.

Further, as yet another enhancement, the pore size within the insulation component should be less than the wavelength of the radiation. By having the pore size within the insulation component less than the wavelength of the radiation, transmission of radiation through pores may be hindered or prevented. For enhanced thermal resistance for temperatures above 1000° C., pore size should be in the range of 2 to 3 microns.

Thermal capacity relates the ability of a material to hold or retain heat. The process-flow components should include materials that have high thermal capacities to retain heat from one step and provide the stored heat to the pyrolysis step, while the insulation components may include lower thermal capacities as the insulation components dissipate the heat, which is not stored or utilized for process fluids. For instance, process-flow components should include materials that provide adequate heat retention capacity to create the temperature profile illustrated in FIG. 1A during operation. Adequate heat transfer rate is characterized by a heat transfer parameter $\Delta T_{HT}$, with $\Delta T_{HT}$ being ≤ about 500.0° C., e.g., about 100.0° C., such as ≤ about 50.0° C. The parameter $\Delta T_{HT}$, is defined as the ratio of the bed-average volumetric heat transfer rate that is needed for recuperation, to the volumetric heat transfer coefficient of the bed, $h_v$. The volumetric heat transfer rate (e.g., cal/cm$^3$ sec) that is sufficient for recuperation is calculated as the product of the gas flow rate (e.g., gm/sec of fuel and oxidant) with the gas heat capacity (e.g., cal/gm ° C. of fuel and oxidant) and desired end-to-end temperature change (excluding any reaction), and then this quantity divided by the volume (e.g., cm$^3$) of the recuperator zone traversed by the fuel and oxidant. As an example for zone 7, the $\Delta T_{HT}$ in channel means 14 ("$\Delta T_{HT}$ Fuel") is computed using the amount of fuel conveyed therethrough, and the $\Delta T_{HT}$ in channel means ("$\Delta T_{HT}$ Oxidant") is computed using the amount of oxidant conveyed therethrough. The total $\Delta T_{HT}$ is substantially equal to ($\Delta T_{HT}$ Fuel)+($\Delta T_{HT}$ Oxidant). The volumetric heat transfer coefficient of the bed, $h_v$, is described in U.S. Pat. No. 7,815,873, which is incorporated by reference.

The properties, such as formability, strength, grain size and distribution, chemical inertness, thermal capacity, and temperature stability, may also be adjusted for insulation components at different locations. Examples of these properties and associated materials utilized in the reactor components are described in various applications, such as U.S. Pat. Nos. 7,815,873 and 7,846,401; along with U.S. Patent Application Publication Nos. 2007-0191664; 2009-0008292; 2008-0300438; 2009-0250377; 2010-0126907; 2010-0130803; 2010-0292522; 2010-0290978; 2010-0288617; 2010-0292523; and 2011-0011768, which are each incorporated by reference herein. Other materials may be utilized in portions of the reactor that are not subjected to operating conditions (e.g., environment or temperatures) that are problematic.

In addition to physical and chemical properties, the materials utilized in insulation components have the capability of being formed into the desired shapes to construct the various zones of the reactor. Formability is the capability of a material to be shaped by deformation, which is useful for process-flow components as these components may be shaped into complex structures to manage the flow of process fluids (e.g., the first, second, fourth, and fifth mixture) through the reactor. It is desirable to obtain components of near net shape, so that any machining of the shapes can be lessened. For insulation components, the formability is less of a concern as these components may be shaped into larger and less complex components, such as bricks, tiles, or castables.

Hot and cold strength is another property that is beneficial for certain reactor components. Process-flow components preferably have sufficient strength to lessen concerns with ruptures and cracks that permit undesired flow of fluids, which may or may not be shared with the insulation components. Each reactor component should have a lessened amount of strength to be able to retain its form during heat up, operation, and cool down.

Similarly, the strength may be measured based on mechanical flexural strength (modulus of rupture, "MOW") and/or crushing strength which may be considered in addition to crystalline/chemical stability at high temperature and toughness. The suitably fabricated reactor component should retain its thermal shock resistance and mechanical flexural strength over a intended operational span without degrading or undergoing crystalline alteration, such as due to loss of stabilizer, and/or due to carbide-oxide corrosion. Thermal shock resistance, which is an evaluated parameter (i.e., not a material property), may depend upon the type of thermal cycle, component geometry, and strength as well as on material properties or factors. Simplified mathematical expressions relying upon a variety of assumptions can be used to describe material performance under a set of conditions along with more complex analyses using numerical analysis methods such as finite element and stress-strain analysis. Such methods may include rapid water quench experiments, such as illustrated in ASTM C1525, or modeling of the thermal-shock-resistance, such as the method provided in Zhou et al. See Zhou et al., "A new thermal-shock-resistance model for ceramics: Establishment and validation", Materials Science & Engineering, pages 272-276, May 31, 2005. As such, the temperature difference before rupture is directly proportional to strength, thermal conductivity and 1 minus Poisson's ratio, and inversely proportional to modulus of elasticity (MOE), coefficient of thermal expansion (CTE), density, and heat capacity. Thus, it is preferred that the test be repeated to analyze the effect of cyclic temperature shocks, such as may be experienced in a regenerative reactor.

Another ceramic performance property is flexural strength, which can be measured by 3-point bending tests as illustrated in ASTM F417 or C133. The thermal shock factor is the maximum delta T a material can withstand before strength is exceeded. The combination of a normalized thermal shock resistance rating of 4, with such MOR strength is recognized herein as a minimal MOR and shock resistance properties may be utilized for reactor components that are exposed to higher reactor temperature spectrums, while lower minimal MOR and shock resistance properties may be utilized for certain components, such as insulation components that are exposed to lower reactor temperatures. Accordingly, the strength may include flexural strength (MOR) of at least 6 kpsi (41.3 MPa), preferably at least 10 kpsi, and provide a thermal shock resistance rating of at least four (4), preferably at least five (5). Further, increasing porosity within insulation components, as noted further below, enhances thermal shock, but may lessen strength of the component. This lessening strength may be acceptable for the benefits provided in insulation components.

Another property is chemical inertness of the reactor components. Chemical inertness relates to the ability of the reactor component to be chemically and physically stable at high temperatures and in the environmental operating conditions. Depending on the operating conditions (e.g., temperature gradient and environmental conditions), the reactor components should be chemically inert or stable (e.g., crystalline/chemical stability at high temperatures) over the useful life.

Certain ceramic or refractory material compositions are resistive to or avoid carburization and ceramic corrosion problems. For example, the reactor may include a reverse flow regenerative reactors reactor, which may involve reducing and oxidizing environments for certain reactor components. The reactor components should be formed of a refractory material suitable for use in a pyrolysis reactor apparatus for pyrolyzing hydrocarbon feedstocks at temperatures in excess of 1500° C. that are resistive to or avoid carburization and ceramic corrosion in active, carbon-rich, environments. The reactor components should avoid carbide-oxide corrosion problems associated with transition of zirconia compound from an oxide to a carbide and then sometimes back to an oxide, with associated undesirable precipitation of carbon and associated undesirable changes in morphological and crystal structure. These problems lead to alterations to the crystal structure, which results in degradation in mechanical strength and thermal shock resistance.

The term "oxide", as uses herein without additional specification, is taken to mean one or more elements that are molecularly combined with primarily oxygen, and specifically not primarily combined with carbon. The term "carbide", as uses herein without additional specification, is taken to mean one or more elements that are molecularly combined with carbon, but which may also include molecular combination with oxygen. Thus, materials such as zirconium oxycarbide $Zr(C_xO_y)$ are generally considered to carbides for the purposes of this application. Specifically, oxides, unless indicated otherwise, are refractory materials that have less than about 10 mole percent carbon, more preferably less than 5 mole percent carbon and even more preferably less than 1 mole percent carbon. Carbides, unless indicated otherwise, are refractory materials that have greater than about 10 mole percent carbon.

In one or more embodiments, the material utilized in the reactor component should have a high melting point and have a thermodynamic preference to remain in the oxide form when exposed to a pyrolysis gas mixture having high carbon activity. Satisfactory refractory materials for a high-temperature regenerative pyrolysis reactor should have a melting point that is higher than that of pure alumina (2050° C.), which was a preferred material under much of the prior art. Due to impurities and practical use limitations, alumina was not suitable for commercial pyrolysis at temperatures above 1500° C. Satisfactory materials for use in the high temperature zone of the reactor have a melting point no less than 2060° C. More preferred materials have a melting point above 2110° C., and even more preferred to have a melting point above 2160° C.

Further, another feature that defines a refractory material's ability to resist carburization and carbide-oxide corrosion is the degree to which the oxide form of the material is stable under the pyrolysis conditions. Materials whose oxide form is stable under all pyrolysis conditions are found to be free of carbide-oxide corrosion. Accordingly, the reactor component may be formed from refractory materials that remain in oxide form when exposed to a gas having a carbon partial pressure of $10^{-10}$ bar, an oxygen partial pressure of $10^{-15}$ bar, and at a temperature over the full range of from 1800° C. to 2100° C. As an example, yttrium oxide or yttria ($Y_2O_3$) is thermodynamically stable in the presence of carbon-containing gases and does not form yttria carbide (YC). The undesirable compound yttrium carbide (YC) is formed from metallic yttrium (Y), not from $Y_2O_3$. Since the stable oxide form, (e.g., $Y_2O_3$) is relatively inert (e.g., thermodynamically stable) to carbon or carbon-containing gases as compared to zirconia, the more stable oxide form (e.g., $Y_2O_3$) appears to suppress detrimental transition from carbide to oxide. The preferred concentration of stable oxide is determined to be >50 wt %, >70 wt %, >80 wt %, >90 wt %, >95 wt %, >99 wt %, or substantially 100%, based upon the total weight of the ceramic material.

In some embodiments, the refractory material may further comprise one or more "secondary oxides" selected from the group consisting of Al, Si, Mg, Ca, Y, Fe, Mn, Ni, Co, Cr, Ti, Hf, V, Nb, Ta, Mo, W, Sc, La, and Ce, and mixtures thereof. The secondary oxides may be merely incidentally present, such as impurities or via contamination or as a result of the sintering, annealing, or other manufacturing process. The secondary oxides may also be purposefully added, such as to improve certain properties or uses, e.g., such as processability during manufacture; or may be generated and deposited as a bi-product from the thermal process and other materials present. The amount of secondary oxides in the stabilized zirconia formed component may typically range from virtually none present, up to 5 wt %, or from 0.001 wt %, present up to 10 wt %, or in some embodiments from 0.01 wt % to 5 wt %, or typically in still other embodiments from 0.1 to 3 wt %, based on the weight of the formed stabilized zirconia component.

Suitable refractory materials for reactor components according to the present techniques are more stable against carbide formation than zirconia. Such materials are defined by having a carbon pressure [pC(g)] for thermodynamic equilibrium between carbide and oxide phase that is greater than pC(g)=$10^{-11}$ at a condition of 2050° C. and pO$_2$(g)=$10^{-15}$ bar. This specification describes the set of materials whose carbide/oxide equilibrium lines fall above this pC(g)=$10^{-11}$ bar at 2050° C. and pO$_2$(g)=$10^{-15}$ bar condition. Such materials will have a complete equilibrium line similar to line [1] or [2], but at a location such that the specific pC(g) value at 2050° C. is greater than $10^{-11}$ bar. Preferred materials are even more stable, having a carbon pressure [pC(g)] for thermodynamic equilibrium between carbide and oxide phase that is greater than pC(g)=$10^{-10}$ bar at a condition of pO$_2$(g)=$10^{-15}$ bar and temperatures from 1800° C. to 2100° C.

As may be appreciated, the term 'triple point', as used here, refers specifically to the triple point for metal, metal carbide, and metal oxide. The zirconium triple point represents the conditions of temperature and composition where Zr, ZrC, and ZrO$_2$ are all in equilibrium with each other at the oxygen partial pressure of $10^{-15}$ bar. For these three phases (Zr, ZrC, and ZrO$_2$), the triple point occurs at specific combinations of pO$_2$(g), pC(g), and temperature. The nature of the thermodynamics that govern this triple point is such that there is only one degree of freedom. Only one of the variables pO$_2$(g), pC(g), and temperature can be set arbitrarily (within limits), and the other two variables are then defined by the thermodynamics of the material. So, for example, at a fixed pO$_2$(g) value of $10^{-15}$ bar, and the other two parameters defining the triple point (pC(g) and temperature) are the result of the thermodynamics of zirconium. Those other two parameters are a pC(g) slightly above $10^{-12}$ bar and a temperature near 2060° C. Those skilled in the art understand that the exact location of the triple point is continuously being refined as scientist's measure thermodynamics and phase behavior more precisely. Because inventors have discovered that materials perform well by being able to avoid certain undesirable phase transitions, it is only natural that some embodiments of the present techniques describe materials with properties given in reference to the equilibrium and triple point locations.

As a result, suitable refractory materials according to the present techniques include materials that have oxide phases more stable than zirconium's oxide phase at a pO$_2$(g) value of $10^{-15}$ bar. Such refractory materials remains in an oxide form at a pC(g) that is higher than the pC(g) at which ZrC and ZrO$_2$ are in equilibrium. Alternately, such refractory materials remains in an oxide form at a pC(g) that is higher than the pC(g) at which the phase transition occurs between ZrC and ZrO$_2$. Materials are suitable for the present techniques if they meet this thermodynamic criteria of oxide stability for any temperature which there is a ZrC/ZrO$_2$ phase boundary. Such temperatures are typically those below the temperature of the triple point as defined at the same pO$_2$(g) value of $10^{-15}$ bar that is applied to the thermodynamic stability criteria.

In other embodiments, suitable refractory materials according to the present techniques have stable oxide phase at temperatures and pC(g) values at which zirconia have no stable oxide phases. Such refractory materials form a thermodynamically stable oxide phase at temperatures above that of the zirconium triple point. For example, such refractory materials form an oxide phase when exposed to a gas having pO$_2$(g) value of $10^{-15}$ bar and temperature above that of the zirconium triple point at a pO$_2$(g) value of $10^{-15}$ bar. In another embodiment, such refractory materials forms an oxide phase when exposed to a gas having pO$_2$(g) value of $10^{-15}$ bar, a temperature above that of the zirconium triple point at a pO$_2$(g) value of $10^{-15}$ bar, and a pC(g) that is higher than the pC(g) at which the phase transition occurs between Zr and ZrC at that same temperature.

Furthermore, suitable refractory materials according to the present techniques may also include materials in the oxide form and materials which also have a thermodynamic preference to remain in the oxide form when exposed to a pyrolysis gas mixture having carbon partial pressure of greater than $10^{-11}$ bar, at conditions of 2050° C. and pO$_2$(g)=$10^{-15}$ bar. Preferably materials remains in the oxide form at carbon partial pressure of greater than $10^{-10}$ bar (at conditions of pO$_2$(g)=$10^{-15}$ bar and temperatures from 1800° C. to 2100° C.). A non-limited example of such refractory material is yttria (yttrium oxide, Y$_2$O$_3$).

It is also preferred that the melting point of the refractory material is no less than 2060° C., which is about 10° C. higher than that of pure alumina (2050° C.), which years of commercial experience demonstrated as inadequate. A suitable refractory material having a melting point no less than 2060° C. is particularly preferred since it enables to process hydrocarbon feedstocks at much higher temperatures. Thus, a regenerative pyrolysis reactor for pyrolyzing hydrocarbons, which may be a revere flow regenerative pyrolysis reactor, comprises reactor components of a material having i) melting point no less than 2060° C. and ii) a thermodynamic preference to be in the oxide form when exposed to a reference gas having a carbon partial pressure of greater than $10^{-11}$ bar.

In one or more embodiment, the material for the insulation component, process flow component or both may be described as an oxide having i) a melting point of no less than 2060° C., and ii) which remains in oxide form when: a) exposed to a first gas at a first temperature, the first gas having: i) an oxygen partial pressure of $1 \times 10^{-15}$ bar, and ii) a carbon partial pressure greater than that at which zirconium oxide changes phase to zirconium carbide at the first temperature; wherein the first temperature is less than that of zirconium's triple point at the oxygen partial pressure, and/or b) exposed to a second gas having an oxygen partial pressure at a second temperature, the second temperature being greater than or equal to that of zirconium triple point at the oxygen partial pressure.

If this material is utilized in an insulation component, it may comprise an oxide having: i) a bulk thermal conductivity in the dense phase ≤5 W/m·K at temperatures in the range of 800° C. to 1600° C., and ii) a porosity of ≥30 vol % based on the volume of insulation component. Other ranges of porosity, emissivity and thermal conductivity may be utilized as noted further below. If this material is utilized in a process-flow component, it may comprise an oxide having: i) a porosity of between 0 and 28 vol % based on the volume of process-flow component, and/or ii) it may comprise a bulk thermal conductivity in the dense phase >2 W/m·K at temperatures in the range of 800° C. to 1600° C.

In some embodiments the crystalline structure of the refractory material is cubic during heat-up from ambient temperature to 2300° C., while in other embodiments the crystalline structure of the refractory material is cubic during cool-down from 2300° C. to ambient temperature. In many preferred embodiments, the vapor pressure of the refractory material is less than $10^{-7}$ bar at 2000° C.

Further, according to many preferred embodiments, the materials that are formed into the reactor components do not include ceramics, oxides, (including compounds and elements) that may be toxic, including, but not limited to, being radioactive, a carcinogen, or other potentially hazardous substance, such as beryllium and thorium. Toxic materials may include, for example, those materials having an eight hour weight average exposure limit of <2 µg/m$^3$ in air.

II. Reactor Apparatus and Process

The term "reactor" refers to equipment used for chemical conversion. As such, several items identified as reactors may be combined to become a single entity that is also identified as a reactor, in that individual and combined entities may be characterized as equipment used for chemical conversion. The terms "pyrolysis" and "pyrolysis chemistry" mean an endothermic reaction conducted at a temperature sufficient for thermally breaking C—C or C—H bonds, optionally aided by a catalyst, e.g., the conversion of hydrocarbons to unsaturates such as ethylene and acetylene.

The terms "reactor", "reactor system", "regenerator", "recuperator", "regenerative bed", "monolith", "honeycomb", "reactant", "fuel", and "oxidant" have the meanings disclosed in U.S. Pat. No. 7,943,808, which is incorporated by reference herein in its entirety. The term "pyrolysis reactor", as used herein, refers to a reactor, or combination or system thereof for converting hydrocarbons by at least pyrolysis. A pyrolysis reactor optionally includes one or more reactors and/or associated equipment and lines. The term pyrolysis reactor encompasses, e.g., the combination and system of first and second pyrolysis reactors described in U.S. Patent Application Publication No. 2007/0191664. Other examples are described in U.S. Pat. No. 7,491,250, U.S. Patent Ser. No. 61/349,464 and U.S. Patent Application Publication Nos. 2007/0144940 and 2008/0142409. With respect to pyrolysis reactors, the term "residence time" means the average time duration for non-reacting (non-converting by pyrolysis) molecules (such as He, $N_2$, and Ar) having a molecular weight in the range of 4 to 40 to traverse the reactor or a defined zone within the reactor, such as a pyrolysis zone of a pyrolysis reactor. The term "pyrolysis stage" means at least one pyrolysis reactor, and optionally including means for conducting one or more feeds thereto and/or one or more products away therefrom. With respect to reactors, the term "zone" or "region" means a location within a reactor, e.g., a specific volume within a reactor and/or a specific volume between two reactors. A "pyrolysis zone" is a volume within the reactor for conducting pyrolysis. The term "thermal pyrolysis" means <50.0% of the heat utilized by the pyrolysis is provided by (a) by exothermically reacting an oxidant with hydrocarbon and/or hydrogen of the first mixture, and/or (b) contacting the first mixture with the gaseous and/or liquid products of combustion to heat the first mixture. The term "thermal pyrolysis reactor" means a pyrolysis reactor wherein ≥50.0% of the heat utilized by the pyrolysis is provided by heat transfer from reactor components, e.g., solid surfaces associated with the reactor such as tubulars or bed materials; optionally ≥80.0% or ≥90.0% of the heat utilized by the pyrolysis is provided by such heat transfer. Optionally, an exothermic reaction (e.g., combustion) occurs within the thermal pyrolysis reactor, the exothermic reaction providing a major amount (i.e., ≥50.0%) of the endothermic heat of pyrolysis, such as ≥75.0% or ≥90.0% thereof. The term "high-severity" with respect to the pyrolysis of a feed comprising hydrocarbon, e.g., the first mixture, means pyrolysis operating conditions resulting in the conversion to acetylene of ≥10.0 wt % of the feed's hydrocarbons based on the total weight of hydrocarbons in the feed.

Regenerative pyrolysis reactors are known and conventionally used for converting or cracking reactions, and to execute cyclic, high temperature chemistry, such as those reactions that may be performed at temperatures higher than can suitably be performed in conventional steam crackers. Regenerative reactor cycles typically are either symmetric or asymmetric. Asymmetric cycles are typically used to execute endothermic chemistry, and the desired endothermic chemistry is paired with a different chemistry that is exothermic (typically combustion) to provide heat of reaction for the endothermic reaction. In this embodiment, the regenerative, reverse-flow pyrolysis reactor is (i) "reverse flow" in the sense that upstream region of the reactor with respect to the average flow of the first mixture is the downstream region with respect to the average flow of the fourth mixture, and (ii) "regenerative" in the sense that at least a portion of the heat consumed during the conversion of the first mixture is provided by exothermically reacting the fourth mixture. Regenerative reactor being a reactor that exothermically reacts fuel and oxidant to store heat within a defined volume in a heating step and removes a portion of the heat during the conversion of a feed stream in a conversion step in sequential steps. For example, under thermal pyrolysis conditions, the regenerative reactor exothermically reacts fuel and oxidant to store heat within a defined volume (e.g., reactor bed) in a heating step and removes a portion of the heat during the conversion of a pyrolysis stream in a pyrolysis step.

Accordingly, as it may be appreciated a variety of regenerative pyrolysis reactors may be utilized in accordance with the present techniques. For example, a hydrocarbon pyrolysis reactor may include a housing, a plurality of input means (e.g., conduits and valves), one or more insulation components (e.g., insulation bricks or tiles) and one or more process-flow components (e.g., reactor beds, mixing components, etc.). The housing may be utilized to enclose an interior region and has one or more insulation components disposed adjacent to the housing. The plurality of input means may include one or more conduits and one or more valves that are configured to manage the flow of one or more streams into the interior region from a location external to the interior region or housing. The one or more process-flow components that are configured to manage the flow of fluids through the interior region, wherein the one or more process-flow components may include a reactor bed having different portions with each having different flow passages and a wetted area. These different reactor components may include different compositions based on the process conditions.

Regenerative reverse-flow reactors may involve multiple steps repeated in sequence to form a cycle for the process. That is, the pyrolysis process may include two or more sequential steps, which include a regeneration step to heat the zones and a pyrolysis step that converts the hydrocarbons in a first mixture into a second mixture (e.g., reactor products) during a hydrocarbon processing mode. The steps may involve passing mixtures over a solid material in fixed orientation (e.g., one or more reactor beds). As part of these steps, valves may be utilized to alternate introduction of hydrocarbons in a first mixture and/or fourth mixture into the interior region of the reactor. As an example, regenerative reactors typically deliver a fourth mixture (e.g., combustion reactants) of fuel, oxidant, and/or a supplemental amount of one of these reactants, directly to a location along the flow path within the reactor (e.g., a mixing zone). The delivered reactants in the fourth mixture then exothermically react (combust) therein and heat the process-flow components. Thereafter, the fifth mixture (e.g., exothermic reaction products, such as combustion products) is exhausted and a first mixture, such as vaporized hydrocarbons, is introduced into the reactor to flow in the opposite direction, and exposed to the heated process-flow components to cause heating and pyrolysis of the hydrocarbons in the first mixture. The second mixture (e.g., pyrolyzed reaction products and/or unreacted first mixture) is then quenched as they flow through the reactor to halt the pyrolysis reactions and yield pyrolysis products (e.g., reactor products). During the quenching, the process-flow components (e.g., reactor beds) absorb heat from the second mixture, sufficient to impart heat into the fourth mixture when the flow is again reversed.

The high-severity operating conditions may include peak pyrolysis gas temperatures between 1200° C. and 2200° C., preferably between 1400° C. and 1900° C. In particular, for reactors with an isothermal temperature profile, the temperatures may be between 1450° C. and 1700° C., or between 1540° C. and 1650° C. For reactors with a Gaussian like temperature profile, the peak pyrolysis gas temperatures may be in the range of 1540° C. to 2200° C. or 1600° C. to 1800° C. Further, the preferred operating pressures may include pressures ≥4 pounds per square inch gauge (psig) (28 kilo Pascals gauge (kPag)), ≥15 psig (103 kPag), ≥36 psig (248 kPag), ≥44 psig (303 kPag), or ≥103 psig (710 kPag), but may be ≤300 psig (2068 kPag), ≤163 psig (1124 kPag), or ≤150 psig (1034 kPag). Residence times in the pyrolysis reactor may be ≤0.5 second, ≤0.3 second and preferably ≤ about 50 milliseconds or in the range of 0.001 seconds to 1.0 seconds or in the range of 0.5 second and 0.001 second. For a regenerative reactor, the process may operate at cycle times in the range of 1 second to 240 seconds, in the range of 1 second to 60 seconds, in the range of 2 seconds to 40 seconds, in the range of 2 seconds to 20 seconds, or even in the range of 3 seconds to 10 seconds.

Also, as may be appreciated, these different pressures and temperatures may be utilized together to form different combinations depending on the specific configuration of equipment. Further, for a regenerative reverse flow reactor, the pressure in the pyrolysis step may be similar or different to the pressure in the regeneration step (e.g., at lower or higher pressure than the pyrolysis step).

The regeneration step has different temperature profiles along the flow path at different locations within the reactor for each of the steps. The shape of that profile depends on many factors, including if and where a heat release reaction (combustion) occurs, the initial temperature distribution, the duration of the regeneration step, the flow rate and inlet temperature of the gas stream, and the heat capacity and transfer properties of the gas and solid material. On average, the solid material is hottest at the end of the regeneration step. The pyrolysis step consumes heat and reduces average solid material temperature. The pyrolysis step changes the profile of temperatures in the solid material, in a way that depends on many factors, including where the heat consumption (pyrolysis) reaction occurs, the initial temperature distribution, the duration of the pyrolysis step, the flow rate and inlet temperature of the gas stream, and the heat capacity and transfer properties of the gas and solid. Fixed-solid regenerative pyrolysis reactors do not operate in the steady state. That is, at any given location, the temperature changes. However, these reactors may be in a periodic steady state, meaning that the same cycling of temperatures occurs over and over as the reactor sequentially repeats the regeneration and pyrolysis steps.

The reactor may include reactor components, such as process-flow components (e.g., reactor components used to manage the flow of mixtures through the reactor, such as a reactor bed and/or mixing component) and insulation components (e.g., reactor components used to manage the heat transfer from the process-flow within the reactor to the external surface of the reactor, such as insulation bricks, tiles, or packing). The reactor components may be formed from different materials, such as refractory materials, which are discussed further below. The heat generated from the regeneration step may preferably be stored in a process-flow component of a refractory material, such as a reactor bed, mixing component and/or other solid material. The process-flow component's material may be designed to facilitate storage and utilization of heat. Checker bricks, tiles, and monoliths may be used as the process-flow components within the reactor. Such materials form a network of passages that are used by the gases in each step to transit the region containing solid material. The refractory material of the process-flow components may be a ceramic, which may include yttria, zirconia, alumina, and/or other refractory material capable of withstanding temperatures within the pyrolysis reactor.

In an embodiment, one or more of the reactor beds include separate passages through reactor components to manage the flow of hydrocarbon components of the first and/or fourth mixtures through the reactor beds. Preferably, each reactor bed includes separate passages. The separate flow passages in the reactor beds can further comprise flow barriers that effectively function as walls to lessen or prevent cross flow or mixing of fluids between passages. Each reactor bed preferably includes multiple passages, which may preferably be in parallel flow arrangement. The channeled reactor bed may preferably be comprised of one or more honeycomb monoliths. Preferred honeycomb monoliths are structures that comprise many (e.g., a plurality, meaning more than one) gas flow passages, arranged in parallel fashion with walls serving to separate each passage. Such reactor can include a single monolith or a plurality of monoliths. Each monolith can be formed by extruding or die pressing monolith blocks with shaped (e.g., square or hexagonal) cross-section and two- or three-dimensionally stacking, such blocks above, behind, and beside each other. Monoliths are particularly effective as reactor beds because they provide high heat transfer capacity with lessened pressure drop.

Figure 1B:
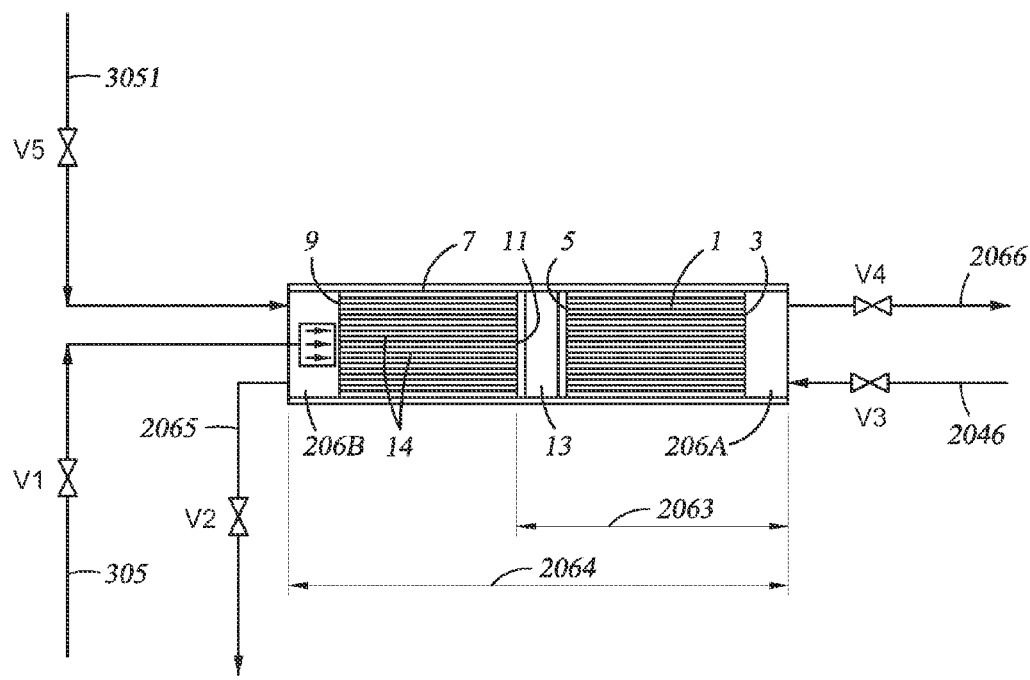

An exemplary embodiment of a reverse-flow regenerative reactor utilized for a two-step asymmetric cycle reaction is depicted in FIG. 1B with the temperature profile depicted in FIG. 1A, which are discussed together for simplicity. The system comprises two reactors: a first (recuperator/quenching) reactor 7 and a second (pyrolysis/reforming) reactor 1. The reactors may be surrounded by one or more insulating components 20, which may be divided into different bricks or tiles, as noted further below.

The first reactor 7 and second reactor 1 comprise reactor beds, the reactor beds comprising bedding or packing material, such as one or more of glass or ceramic beads or spheres; metal beads or spheres; (i) ceramic, including, e.g., alumina, silica, yttria, zirconia, etc., and mixtures thereof; or (ii) metal honeycomb materials; ceramic tubes; extruded monoliths catalysts; etc. The materials comprising the reactor bed are selected to maintain integrity, functionality, and withstand long term exposure to temperatures ≥700° C., e.g., ≥1200° C., such as ≥1500° C., or even ≥2000° C. for operating margin. The operation and configuration of the first and second reactors can be, e.g., the same as those described in U.S. Pat. No. 7,943,808. The shape of the reactor beds is not restricted to any particular geometry. For example, the first and second reactors can be elongated, and can have elliptical, cylindrical, and/or rectangular cross-sections, including combinations thereof. The reactors can be of the same shape and size, but this is not required. For example, the first reactor can be in the form of a honeycomb monolith of substantially cylindrical cross-sections. The first reactor's channels each comprise a plurality of passages, the passages comprising substantially parallel, substantially independent flow-paths within the regenerative media, e.g., within the honeycomb.

As noted above, reactors 1 and 7 may be divided into regions or zones. A region or zone has a beginning and end represented by a plane or surface that is roughly orthogonal to net flow direction and a region or zone has a characteristic "zone temperature" that is an average over all locations in the zone and an average over any periodic temperature changes that occur due to reverse-flow reactor operation. Zone temperature can be measured or predicted, as is well known in the art. There need not be any physical manifestation within the reactor of the zone's beginning or end. It may simply be a mathematical construct defining region within an otherwise homogenous reactor bed.

In one or more embodiments, reactor beds have cool ends (e.g., end 9 of reactor 7 or end 3 of reactor 1) that have average temperatures below 700° C. Thus, one can identify a "base zone" within reactor 1 or 7 that has a zone temperature $T_B$ that is near 700° C., such as between about 600° C. and 800° C. This base zone may include reactor contents that have a wide range of temperatures (e.g., 300° C. to 1000° C.) or a narrow range of temperatures (e.g., 650° C. to 750° C.). Additional zones through the reactor may also be identified. For instance, zone j (e.g., where T denotes any other zone) may be a zone within reactor 1 or 7 that has a zone temperature $T_j$ that is near 1000° C., such as temperatures in the range of about 800° C. and 1200° C. or in the range of 900° C. to 1100° C. Another zone j may have a zone temperature $T_j$ that is greater than or equal to (≥) 1200° C., ≥1500° C., or ≥1700° C., such as temperatures in the range of about 1200° C. and 1800° C., in the range of 1400° C. to 1700° C. or in the range of 1500° C. to 1700° C.

For certain zones, it should be appreciated that the materials in the reactor components may be adjusted to enhance operation of the system. For instance, the heat transfer rate involves convective heat transfer and radiant heat transfer, which are present in different amounts based on the process conditions (e.g., operating temperatures). Convective heat transfer has a rate that is proportional to surface area (e.g., wetted area, or transfer area per bed volume), while radiative heat transfer is emitted by gases and components within the reactor. For instance, in a zone that is exposed to temperatures >700° C., >1000° C., and >1200° C., emissivity has the effect of boosting the radiative heat transfer for insulation components. Thus, if one employs a material with unusually high emissivity in a hot zone, then the insulation component may fail to properly manage the heat within the reactor.

To operate, various steps may be performed as part of a cycle. It is understood that one or more of valves V1-V5 and other flow control devices (e.g., check valves, louvers, flow restrictors, timing systems, etc.) can be used to control fluid flow through reactors 1 and 7 for the first, second, fourth, and fifth mixtures, and the optional purge gas when used. These mixtures are described further below. For example, a means for conveying fuel (via conduit 305) and oxidant (via conduit 3051) into the appropriate channels in the first reactor may include one or more of plenums, valves, vanes, spargers, and/or distributors. Suitable spargers, distributors, etc., are disclosed in U.S. Pat. No. 7,815,873, which is incorporated by reference herein in its entirety. Although the present techniques are compatible with the use of conventional spargers, distributors, plenums, etc., in stage 206, the invention is not limited thereto.

The heating step thus includes the following features: (i) heating of region 13 and the second reactor 1 by transferring at least a portion of the heat of combustion to the reactor system downstream of the end 11 of the first reactor 7, and (ii) by transferring at least a portion of the sensible heat recovered by the first and second reactants in an upstream region of the first reactor (upstream with respect to the flow of the first and second reactants) toward one or more of the downstream region of the first reactor, region 13, or the second reactor to thermally regenerate the reactor system. Accordingly, at least a segment of each of the right-hand and left-hand edges the temperature profile translate downstream from their starting locations at the beginning of the heating step, as shown in FIG. 1A by arrows 6 and 8. It should be recognized that the translations indicated by arrows 2, 4, 6, and 8 of the temperature profile's edges during the heating and pyrolysis steps confines the temperature profile (which can achieve temperatures, e.g., >1600° C.) to regions of the reactor that can tolerate such conditions long-term. Optionally, the shift in the edges of the temperature profile is accompanied by a shift in the position of the peak of the temperature profile. Operating conditions during the heating step can be substantially the same as those disclosed in U.S. Pat. No. 7,943,808. In an embodiment, the exothermic reaction of the fuel and oxidant components of the fourth mixture includes combustion, the combustion conditions including a temperature ≥1400° C., e.g., ≥1500° C., such as ≥1600° C., e.g., in the range of 1900° C. to 2200° C., and a pressure ≥1.0 bar (absolute), e.g., in the range of 1.0 bar to 15.0 bar, such as 2.0 bar to 8.0 bar.

In this embodiment, the total duration of a regeneration step $t_2$ is for a time sufficient for the second reactor to abstract sufficient heat from the oxidation to accomplish the pyrolysis step. In other words, the heating step is conducted for a time duration greater than or equal to a time sufficient to displace the peak of the temperature toward the second reactor sufficient to heat the pyrolysis region 2064 for exposing the first mixture to a temperature ≥$1.20 \times 10^{3}$° C. during the pyrolysis step. Optionally, $t_2$ is in the range of 0.1 seconds to 30.0 seconds. Optionally, the total amount of heat added to the reactor system during the regeneration step does not exceed the sum of the heat that is required (a) to sustain the pyrolysis reaction for endothermically driving the second mixture from the pyrolysis portion of the first mixture, and (b) for heat losses from the system, e.g., by as conduction losses through reactor walls, and/or convective losses with, e.g., the second mixture. Optionally, the total amount of heat stored in the reactor system is generally much more than the minimum amount of heat needed for the pyrolysis step.

During the pyrolysis step (e.g., the reaction step), the second reactor 1 is at an elevated temperature and the first reactor 7 is at a lower temperature than the second reactor 1. A first mixture (e.g., a pyrolysis feed) is introduced via a conduit 2046, into a first end 3 of the second reactor 1. The first mixture abstracts heat from the reactor 1 and is reacted, optionally with a catalyst, to produce the desired pyrolysis reaction.

At least a portion of a second mixture derived from the first mixture exits the second reactor 1 through a second end 5 at an elevated temperature and passes through the first reactor 7, entering through a first end 11 and exiting at a second end 9. A vapor-phase portion of the second mixture is conducted away from the reactor system via conduit 2065, with a second portion of the second mixture optionally remaining in one or more of reactor 1 or 7 or mixing zone 13, e.g., as a deposit, such as a coke deposit. The first reactor 7 is initially at a lower temperature than the second reactor 1. As the first and/or second mixture pass through the first reactor 7, they are cooled to a temperature subsisting proximate to the second end 9 of first reactor 7. The temperature at that location can be, e.g., approximately the same temperature as that of the fuel and oxidant introduced at that location during the heating step (the regeneration step) of the cycle.

A continuous or semi-continuous process for deriving (a) the second mixture from the first mixture and (b) the fifth mixture from the fourth mixture in a regenerative, reverse-flow reactor system will now be described in more detail. One feature of this process is the use of mixing means in zone 13, which is located between reactor 7 and reactor 1.

The first mixture, second mixture, third mixture, and fourth mixtures will now be described in more detail.

III. Mixtures

In an embodiment, the first mixture comprises hydrocarbon and optionally further comprises molecular hydrogen and/or diluent. The term "hydrocarbon" means (i) molecules (and mixtures thereof) including both carbon atoms and hydrogen atoms, and optionally including other atoms (heteroatoms) such as oxygen, sulfur, and nitrogen, wherein the carbon atoms and hydrogen atoms together comprise ≥75.0% of the atoms present in the molecule or mixture of molecules. The term "molecular hydrogen" means $H_2$. The type of hydrocarbon is not critical, e.g., the hydrocarbon can even compromise hydrocarbon non-volatiles, including those that are not in the gas phase at the temperature, pressure, and composition conditions subsisting at the inlet to the pyrolysis reactor.

In an embodiment, the hydrocarbon is derived from one or more source materials. The term "source materials" means sources, containers, conduits, vessels, reservoirs, etc., of hydrocarbon. Examples of source materials comprising hydrocarbon include one or more of methane, methane-containing streams, distillates, residues, hydrocarbon streams derived from plant or animal matter, and/or combinations thereof. Suitable hydrocarbon source materials include those described in U.S. Pat. Nos. 7,943,808 and 7,544,852, which are incorporated by reference herein in their entirety. As an example, the first mixture may include comprise ≥50 wt % hydrocarbons based on the total weight of the first mixture.

The first mixture can be derived from the source material(s) located upstream of the pyrolysis, but this is not required. For example, in one embodiment hydrocarbon derived from a first source material and hydrogen derived from a second source material are conducted separately to the pyrolysis reactor, the hydrocarbon and hydrogen being combined to produce the first mixture proximate to (e.g., within) the pyrolysis reactor. Optionally, the hydrocarbon has (or is derived from one or more source materials having), e.g., a hydrogen content in the range of 6.0 wt % to 25.0 wt %, 8.0 wt % to 20.0 wt % (e.g., not natural gas), or 20.0 wt % to 25.0 wt % (e.g., natural gas). The term "hydrogen content" of a mixture or source material means atomic hydrogen bound to carbon and/or heteroatoms covalently bound thereto and which excludes molecular hydrogen ($H_2$) in the mixture (or source material) expressed as a weight percent based on the weight of the hydrocarbons in the mixture (or source material).

When the first mixture further comprises molecular hydrogen, the first mixture optionally has a molecular hydrogen to carbon (as all carbon atoms in the first mixture that are not bound to oxygen atoms, e.g., as can be determined by Nuclear Magnetic Resonance Spectroscopy) molar ratio in the range of from 0.0 to 15.0, e.g., 0.1 to 4.0, such as 1.0 to 3.0 or 1.0 to 2.0. Optionally, the first mixture has a hydrogen (all hydrogen atoms in the first mixture regardless of atomic or molecular form) to carbon (all carbon atoms in the first mixture regardless of atomic or molecular form) atomic ratio in the range of from 1.0 to 15.0, e.g., in the range of from 3.0 to 8.0.

Optionally, the first mixture further comprises diluent, e.g., ≥1.0 wt % of diluent based on the weight of the first mixture. Suitable diluents (which can be a diluent mixture) include one or more of oxygenate, nitrogen ($N_2$), hydrogen sulfide, $C_{4+}$ mercaptans, amines, mixtures of amines, non-hydrocarbon non-volatiles (whether combustible or not), including refractory inorganics such as refractory oxygenates, inert gas (including inert gas mixtures), etc. In an embodiment, the first mixture comprises ≤10.0 wt % diluent. The term "non-volatiles" means molecules and mixtures thereof having a nominal atmospheric boiling point ≥570.0° C., e.g., refractory oxygenates, refractory hydrocarbons, metals, minerals, etc. American Society of Testing and Materials ("ASTM") methods can be used to determine the nominal atmospheric boiling point (ASTM method 1078) and the amount and properties of such non-volatiles, such as ASTM methods D-6560, D-7061, D-189, D-482, D-524, and D-2415. Non-volatiles that are capable of being combusted are called "combustible non-volatiles". The term non-volatiles encompasses e.g., coke, ash, soot, resid, metal, mineral, ash-forming asphaltenic, tar, etc., including those formed, e.g., during or after oxidation (e.g., combustion or partial oxidation) and/or pyrolysis, including those which may remain as a residue or deposit in the reaction zone. Optionally, one or more mixtures and/or source materials comprises $C_{3+}$. The term "$C_{3+}$" means molecules having at least three carbon atoms, including, e.g., coke and soot, whether those products emerge from the reactor or remain within the pyrolysis reactor. The term coke means combustible non-volatile products of pyrolysis that remain in the reactor, while the term soot means combustible non-volatile products of pyrolysis that are carried out of the reactor (e.g., in the reactor effluent). The term "reactor effluent" means products of pyrolysis conducted away from the reactor. The reactor effluent comprises $C_2$ unsaturates, where the term "$C_2$ unsaturates" means hydrocarbon having two carbon atoms and ≤4 hydrogen atoms.

In an embodiment, the second mixture comprises ≥1.0 wt % of $C_2$ unsaturates and ≥1.0 wt % of combustible non-volatiles, based on the weight of the second mixture. Optionally, ≥50.0 wt %, e.g., ≥75.0 wt %, such as ≥90.0 wt % of the combustive non-volatiles comprise $C_{3+}$ species such as coke, based on the weight of the combustible non-volatiles in the second mixture. For example, the second mixture can comprise an amount $ac_1$ of $C_2$ unsaturates and an amount $ac_2$ of $C_{3+}$ hydrocarbon, wherein (i) $ac_1 \geq 1.0$ wt % and $ac_2 \geq 0.1$ wt % based on the weight of the second mixture, and (ii) the $C_{3+}$ hydrocarbon comprises ≥90 wt % coke based on the weight of the $C_{3+}$ hydrocarbon in the second mixture. Optionally, the second mixture further comprises one or more of hydrogen, methane, ethane, or diluent. Besides coke, the $C_{3+}$ hydrocarbon optionally further comprises benzene and/or paraffin (iso-, cyclo-, and/or normal) having ≥3 carbon atoms, etc. Optionally, the second mixture has an $ac_2$:$ac_1$ ratio ≤ about 1.0, e.g., ≤ about 0.6, such as ≤ about 0.4. Optionally, the second mixture has one or more of the following additional properties: an acetylene:ethylene molar ratio in the range of about 0.5 to about 20.0, e.g., about 1.0 to about 10.0, such as about 1.5 to about 6.0; a molecular hydrogen:$C_2$ unsaturates molar ratio in the range of 2.0 to 20.0; a molecular hydrogen:acetylene molar ratio ≥0.75, or ≥3.0, e.g., in the range of 3.0 to 20.0. Optionally, the second mixture comprises ≥1.0 wt %, methane e.g., 2.0 wt % to 50.0 wt %; ≥1.0 wt % molecular hydrogen, e.g., 2.0 wt % to 5.0 wt %; ≥1.0 wt % acetylene, e.g., 2.0 wt % to 40.0 wt %; ≥1.0 wt % ethylene, e.g., 2.0 wt % to 70.0 wt %, such as 2.0 wt % to 20.0 wt %; and ≥1.0 wt % $C_{3+}$, e.g., 2.0 wt % to 50.0 wt %, the weight percents being based on the weight of the second mixture.

Producing the second mixture from the first mixture by pyrolysis is an endothermic reaction, which withdraws heat from the pyrolysis reactor system. At least a portion of this heat can be replaced, e.g., during a regeneration step, so that the process can be operated in sequence (pyrolysis step followed by regeneration step), e.g., continuously.

The fourth mixture comprises first and second reactants, e.g., fuel and oxidant. Exothermically reacting the fuel and oxidant provides at least a portion of the heat utilized by the pyrolysis, e.g., ≥50%, such as ≥75%, or ≥95% of the heat utilized by the pyrolysis. Additional heat, when needed, can be provided to the regenerative, reverse-flow pyrolysis reactor by, e.g., a burner or furnace, e.g., a furnace external to the reactor, but in thermal communication therewith. The fuel and oxidant mix within the mixing zone 13 to produce the fourth mixture, the fuel and oxidant then reacting, e.g., by an oxidation reaction such as combustion. The fuel can comprise, e.g., molecular hydrogen, synthesis gas (mixtures of CO and $H_2$), or hydrocarbon, such as ≥10.0 wt % hydrocarbon (including mixtures thereof), or ≥50.0 wt % hydrocarbon, or ≥90.0 wt % hydrocarbon based on the weight of the fuel. The oxidant can comprise, e.g., ≥10.0 wt % molecular oxygen, e.g., ≥50.0 wt % molecular oxygen, or ≥90.0 wt % molecular oxygen based on the weight of the oxidant. When the fuel comprises hydrocarbon, the particular hydrocarbon selected is not critical. For example, in an embodiment, the hydrocarbon comprises one or more of the hydrocarbons specified for the first mixture, e.g., methane. In an embodiment, the hydrocarbon is derived from, comprises, consists essentially of or consists of one or more of methane, methane containing streams such as coal bed methane, biogas, associated gas, natural gas, and mixtures or components thereof, etc. When the fuel comprises hydrogen and/or hydrocarbon, the choice of oxidant is not critical, provided the oxidant is capable of exothermically reacting with the hydrogen and/or hydrocarbon. For example, in an embodiment, the oxidant comprises, e.g., molecular oxygen and/or ozone.

It is generally beneficial to increase the amount of oxidant in the fourth mixture beyond that needed to oxidize substantially all of the fourth mixture's fuel, e.g., to oxidize combustible non-volatiles remaining in the reactor beds as a result of the pyrolysis of the first mixture. The fourth mixture may also comprise diluent, such as one or more of, e.g., oxygenate (water, carbon dioxide, etc.), non-combustible species, nitrogen ($N_2$), hydrogen sulfide, $C_{4+}$ mercaptans, amines, mixtures of amines, non-hydrocarbon non-volatiles (whether combustible or not), including refractory inorganics such as refractory oxygenates, inert gas (including inert gas mixtures), etc. (e.g., ≥1.0 wt % of diluent based on the weight of the fourth mixture).

The fifth mixture comprises (i) products derived from the exothermic reaction of the fourth mixture's fuel and oxidant, and optionally, (ii) diluent, when diluent is present in the fourth mixture, (iii) unreacted fuel and oxidant, and/or (iv) products derived from the reaction of the fourth mixture with combustible, non-volatiles in the reactor. When the exothermic reaction of the fuel and oxidant involves hydrocarbon combustion, or when a diluent is present in the fourth mixture (such as $N_2$ or $H_2S$), the fifth mixture can comprise carbon oxides, and can further comprise sulfur oxides, nitrogen oxides, etc.

IV. Insulation and Reactor Component Configurations

In one or more embodiments, the insulation components within the reactor may be specifically tailored to provide certain properties, as noted above. These insulation components may be configured to vary based on the layer, or within an internal composition of an insulation component. Further, a specific configuration of insulation components may be utilized to further enhance the process, as noted in the FIG. 6 below.

Figure 6:
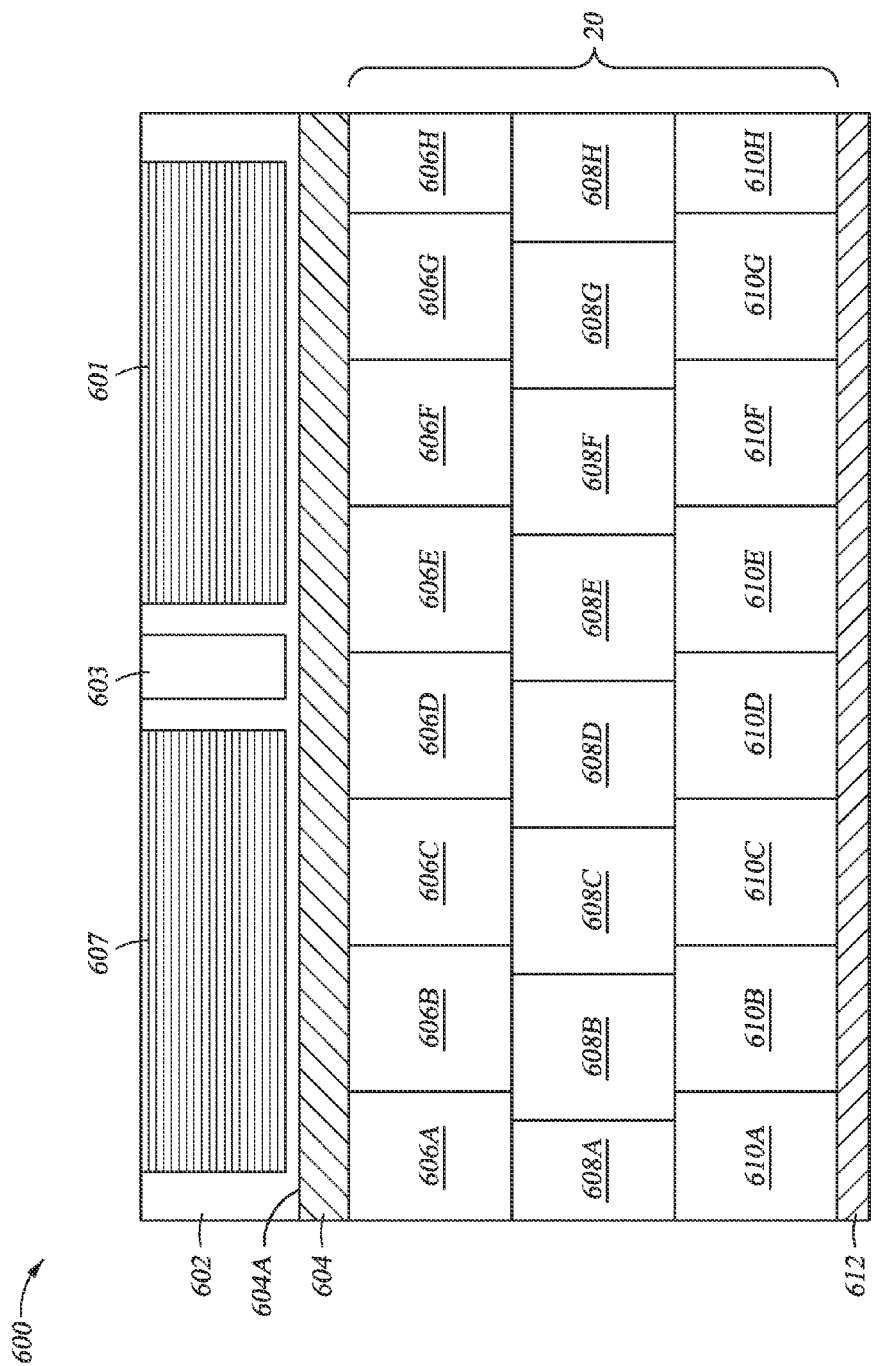
FIG. 6 schematically illustrates one embodiment of a configuration of insulation components along with a process-flow component in accordance with an embodiment of the present techniques.

FIG. 6 is one embodiment of a configuration 600 of insulation components along with process-flow components in accordance with an embodiment of the present techniques. In this configuration 600, the interior region 602 of a portion of a reactor includes a mixing component 603 disposed between a first reactor bed 601 and a second reactor bed 607. These reactors beds 601 and 607 may each be a honeycomb monolith or other suitable structure that provides passages for process fluid flow. The mixing component 603 may include one or more mixer/distributors that are configured to intermingle process fluids as they pass through the interior region 602 of the reactor. These reactors beds 601 and 607 and mixing component 603 may be a partial view of the reactors 1 and 7 and mixing component 13.

Adjacent to the reactor beds 601 and 607 and mixing component 603 is a fluid barrier layer 604. The fluid barrier layer 604 may be utilized to prevent or limit the flow of fluids from within reactor beds 601 and 607 and mixing component 603 into the insulation 20. Accordingly, the fluid barrier layer 604 may have a low porosity to minimize the flow of fluids. Similar to other process-flow components, such as the reactor beds 601 and 607 and mixing components 603, this fluid barrier layer should have certain properties to be able to withstand the operating conditions (e.g., have chemical stability and thermal stability).

Further, as the fluid barrier layer 604 has a surface 604A that is adjacent to the reactor beds 601 and 607 and mixing component 603, the fluid barrier layer 604 may have a composition for at least a portion of fluid barrier layer 604 that radiates heat toward the mixing component 603 and/or the reactor beds 607 and 601. The fluid barrier layer 604 may also have different thermally conductive based on its location, which may limit Hydrogen from penetrating the fluid barrier layer (e.g., low porosity or higher density). In certain embodiments, the fluid barrier layer 604 may have a composition that varies from one surface 604A to the other. For instance, the fluid barrier layer 604 near the mixing component 603 and in contact with the insulation layers 606D and 606E may have a thermal conductivity in the dense phase ≤4 W/m·K at temperatures in the range of 1200° C. to 1600° C. and an emissivity <0.45 at 1500° C. In contrast, the fluid barrier layer 604 near the respective ends of the reactor beds 601 and 607 and in contact with the insulation layers 606A-606C and 606F-606H may have a thermal conductivity in the dense phase >4 W/m·K at temperatures in the range of 1200° C. to 1600° C. and an emissivity ≥0.45 at 1500° C. In this manner, the radiation of heat may be reflected or radiated toward the mixing zone.

The insulation 20, which may include one or more layers of bricks or castables, is represented in the embodiment by three layers of bricks or castables 606A-606H, 608A-608H, and 610A-610H along with an outer shell 612. These different layers of bricks or castables 606A-606H, 608A-608H, and 610A-610H may be configured to prevent or minimize the flow of fluids to the outer shell 612, and/or may be configured to have low thermal conductivity to minimize the temperature at the outer shell 612.

Accordingly, the layers of bricks or castables 606A-606H, 608A-608H and 610A-610H may have high porosity based on the volume of respective castables and low thermal conductivity to minimize heat transfer, and in certain locations may have lower emissivity. As an illustrative example, the layers of castables 606A-606H may have a porosity >30 vol % and a thermal conductivity ≤5 W/m·K at temperatures in the range of 800° C. to 1600° C. The layers of castables 608A-608H may have a porosity >35% and a thermal conductivity ≤4 W/m·K at temperatures in the range of 800°

C. to 1600° C. The layers of castables 610A-610H may have a porosity >35% and a thermal conductivity ≤2 W/m·K at temperatures in the range of 800° C. to 1600° C. As another illustrative example, the layers of brick 606A-606H may have a porosity >30 vol % and a thermal conductivity ≤5 W/m·K at temperatures in the range of 800° C. to 1600° C. The layers of brick 608A-608H may have a porosity in the range of 30 vol % to 50 vol % and a thermal conductivity in the range of 1 to 3 W/m·K at temperatures in the range of 800° C. to 1600° C. The layers of castables 610A-608H may have a porosity in the range of 51 vol % to 75 vol % and a thermal conductivity in the range of 0.1 to 0.9 W/m·K at temperatures in the range of 800° C. to 1600° C.

In other embodiments, the first layer of castables may have a pore size or porosity that hinders the penetration or flow of fluids, such as hydrogen, into the insulation components or toward the outer shell (away from the process flow components). That is, if a fluid barrier layer 604 is not utilized, the first layer of bricks or castables 606A-606H may have a porosity that is lower than the porosity of the layers of bricks 608A-608H and 610A-610H. The low thermal conductivity may still be utilized by each of these layers to minimize heat transfer, and in certain locations may have lower emissivity. As an illustrative example, the layers of castables 606A-606H may have a porosity 11 vol % to 28 vol % and a thermal conductivity ≤5 W/m·K at temperatures in the range of 800° C. to 1600° C. The layers of castables 608A-608H may have a porosity >35% and a thermal conductivity ≤4 W/m·K at temperatures in the range of 800° C. to 1600° C. The layers of castables 610A-610H may have a porosity >35% and a thermal conductivity ≤2 W/m·K at temperatures in the range of 800° C. to 1600° C. Alternatively, the layers of brick 608A-608H may have a porosity in the range of 30 vol % to 50 vol % and a thermal conductivity in the range of 1 to 3 W/m·K at temperatures in the range of 800° C. to 1600° C., while the layers of castables 610A-608H may have a porosity in the range of 51 vol % to 75 vol % and a thermal conductivity in the range of 0.1 to 0.9 W/m·K at temperatures in the range of 800° C. to 1600° C.

As an example, insulation components may include materials of stabilized zirconia stabilized primarily by yttria (includes $Y_2O_3$ and/or an yttrium-containing compound), although other stabilizing compounds or elements may also be present in concentrations that are secondary to the yttria concentration. Yttria is present in an amount of >21 wt %, >25 wt %, >28 wt %, or >30 wt % yttria, based upon the total weight of the insulation component. In many embodiments, the insulation component may include materials of >50 wt %, or >80 wt %, or even >90 wt % of a thermodynamically stable oxide material, (e.g., such as, but not limited to, yttria).

In addition to the porosity and thermal conductivity, these different layers of castables may have different emissivities. As noted above, the process-flow component may have >0.45 emissivity and the emissivity for an insulation component may preferably be ≤0.45. In particular, an insulation component may be exposed to higher temperatures, such as ≥700° C., ≥1000° C., or ≥1400° C., and be formed from a material having emissivity <0.65, or <0.55, or <0.45, or <0.35, or even <0.3 at 1000° C. These aspects along with other variations are discussed further below.

Figure 7:
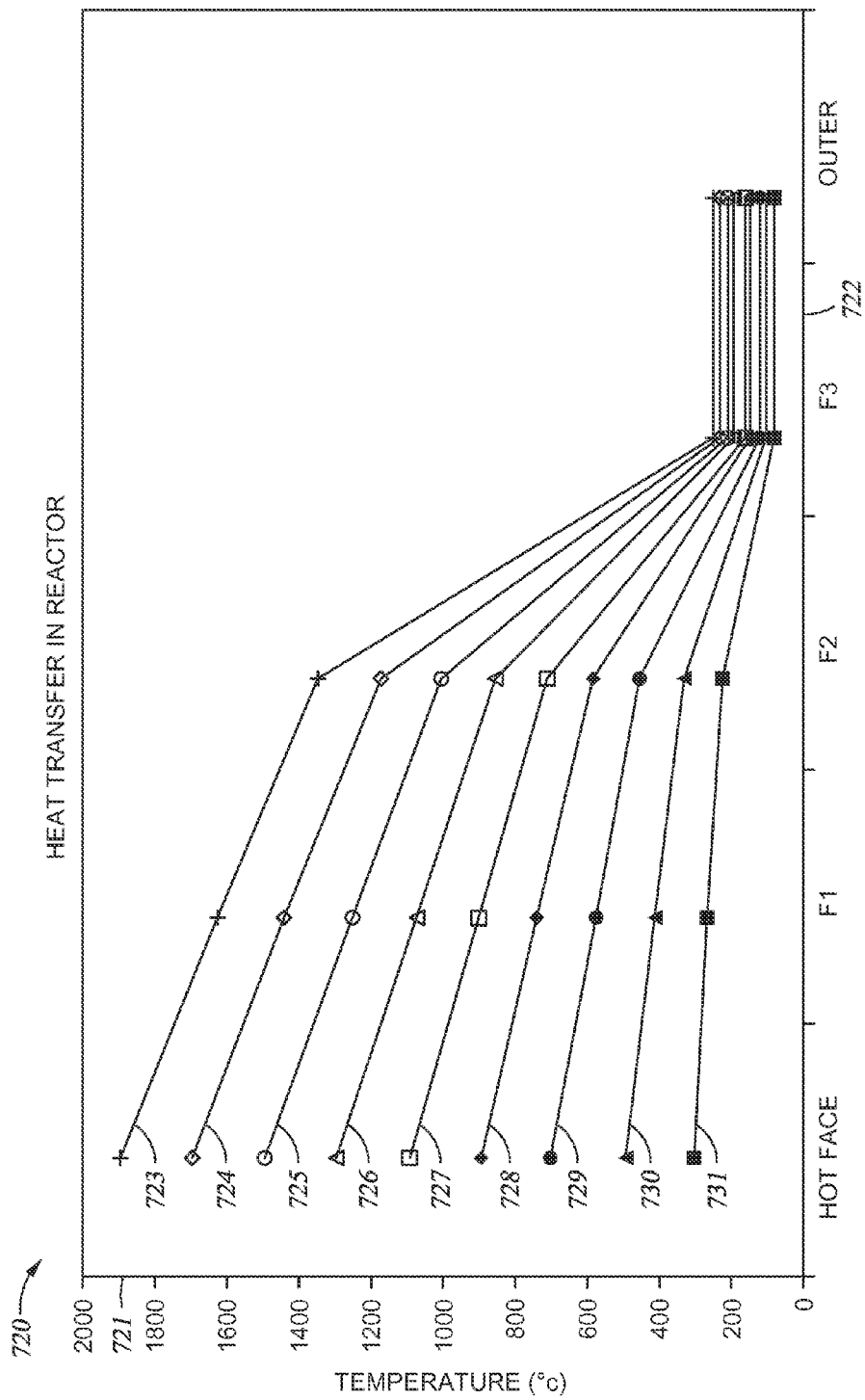
FIG. 7 illustrates an exemplary diagram of heat transfer in a reactor for different temperatures in accordance with an embodiment of the present techniques.

As an example, FIG. 7 is an exemplary diagram 720 of heat transfer for different temperatures in a reactor based on simulation results. In this diagram 720, the temperature profile 723-731 for different portions of the reactor at different temperatures are illustrated from the fluid barrier layer 604 through the insulation layers of bricks 606A-606H, 608A-608H, and 610A-610H to the outer shell 612. Reactions, in this example, is carried out under isothermal conditions with fluid barrier layer ("Hot Face") being in the range of 10 mm to 50 mm thickness, the first insulation layer ("IF1") of bricks 606A-606H having a 114 mm wall thickness and a composition of Product 1651, the second insulation layer ("IF2") of bricks 608A-608H having a 114 mm wall thickness and a composition of Product 1968, the third insulation layer ("IF3") of bricks 610A-610H having a 114 mm wall thickness and a composition of Golite 155, and an outer shell 612 ("Outer") having a 55 mm wall thickness and a composition of carbon steel. That is, the outer shell may include carbon steel such as >50 wt % carbon steel based on the weight of the outer shell. These results consider the ambient temperature external to the reactor being 30° C., with no wind and external emissivity of 0.90.

In diagram 720, certain values for heat profiles are shown along the Y-axis 721 for various temperatures (in ° C.) along the X-axis 722 for certain locations. These locations correspond to the fluid barrier layer 604, insulation layers of bricks 606A-606H, 608A-608H, and 610A-610H, and outer shell 612 (which may be referred to as insulation layers 606-612 for simplicity). The peak temperature in these temperature profiles is at the fluid barrier layer and decreases to the lowest temperature, which is experienced by the outer surface. As illustrated, the fluid barrier layer and first insulation layer are exposed to higher temperatures, which decrease by 25% or more from the peak temperature. The third insulation layer and outer surface experience temperatures below 300° C. The insulation components may have closed pores to reduce flow of fluids through the insulation layers. Accordingly, the second and third layers may not be exposed to the chemical stability challenges that are present for the fluid barrier layer and first insulation layer.

Accordingly, the different insulation components may be configured to appreciate the different temperatures and environmental conditions. In particular, the properties and/or compositions may vary between different reactor components (e.g., between the fluid barrier layer 604 and insulation layers 606-612 or between insulation layers 606-612). As an example, the composition of the fluid barrier layer and the first insulation layer of bricks 606A-606H may have a first composition, the second insulation layer of bricks 608A-608H may have a second composition, and the third insulation layer of bricks may have a third composition. The first composition may include >50 wt % yttria, the second composition may include >50 wt % zirconia, and the third composition may include >50 wt % alumina. As another example, the fluid barrier layer 604 may have porosity in the range of 0 vol % to 5 vol %, while the insulation layers of bricks 606A-606H, 608A-608H, and 610A-610H may have porosity in the range of 30 vol % to 75 vol %. As another example, the composition of the fluid barrier layer and the first insulation layer of bricks 606A-606H may have a first composition including >50 wt % yttria. The composition of the second insulation layer of bricks 608A-608H may have a second composition including >50 wt % alumina. The composition of the third insulation layer of bricks or castables 610A-610H may have a third composition including >50 wt % alumina.

In other embodiments, the properties and/or compositions between insulation component in the same layer (e.g., insulation bricks in a layer 606A-606H, 608A-608H, or 610A-610H) may vary. For instance, one embodiment may include the fluid barrier layer 604 and insulation bricks 606C-606F having a composition of >50 wt % yttria, the insulation bricks 606A, 606B, 606G, and 606H, 608A-608H, having a composition of >50 wt % zirconia or >50 wt % alumina, and the insulation bricks or castables 610A-610H having a composition of alumina. As another example, the fluid barrier layer 604 may have porosity in the range of 0 vol % to 5 vol %, while the insulation layers of bricks 606A-606H have a porosity in the range of 30 vol % to 50 vol %, the insulation bricks 608A-608H may have a porosity of 50 vol % to 75 vol %, and the insulation bricks or castables 610A-610H may be a porosity in the range of 30 vol % to 75 vol %.

In yet other embodiments, the properties and/or compositions within a reactor component (e.g., a fluid barrier layer 604 and/or insulation layers 606-612) may vary. For instance, one embodiment may include the fluid barrier layer 604 having porosity in the range of 0 vol % to 5 vol % on a first surface 604A based on the volume of fluid barrier layer, while the second surface has a porosity of 10 vol % to 20 vol % based on the volume of the fluid barrier layer. Similarly, insulation bricks 606A-606H, 608A-608H, and 610A-610H may have porosity in the range of 30 vol % to 40 vol % on the surface closest to the reactor interior, while the surface closest to the outer surface may have porosity in the range of 50 vol % to 75 vol %. Another embodiments may include the fluid barrier layer 604 having porosity in the range of 0 vol % to 10 vol % on a first surface 604A, while the second surface has a porosity of 11 vol % to 29 vol %. Similarly, insulation bricks 606A-606H and 608A-608H may have porosity in the range of 30 vol % to 40 vol % on the surface closest to the reactor interior, while the surface closest to the outer surface may have porosity in the range of 41 vol % to 50 vol %. The insulation castables 610A-610H may have porosity in the range of 51 vol % to 75 vol %.

Similarly, the emissivity of for the insulation component may preferably be ≤0.45. In particular, an insulation component may be exposed to higher temperatures, such as ≥700° C., ≥1000° C., or ≥1400° C., and be formed from a material having emissivity <0.65, or <0.55, or <0.45, or <0.35, or even <0.3 at 1000° C. These aspects along with other variations are discussed further below.

In yet other embodiment, the insulation component may also vary within the insulation component. That is, the brick or castable may have different porosity, emissivity and/or thermal conductivity from one surface to another in an individual component (e.g., for the layer near the surface). As an example, the insulation component may include a first surface and a second surface, which may be opposite each other for the insulation component. The insulation component may have a second porosity at the second surface that is different by >2%, or >4%, or even >10% from a first porosity at the first surface. Also, the insulation component may have a second thermal conductivity or emissivity at the second surface that is different by >2%, or >4%, or even >10% from a first thermal conductivity at the first surface. In yet another example, the insulation component may have a second thermal conductivity at the second surface that is different by >2%, or >4%, or even >10% from a first thermal conductivity at the first surface. As may be appreciated, the embodiments above describe the insulation layers as three layers of insulation components and an outer shell. However, the above described embodiment is for exemplary purposes. The number of insulation layers may vary to be one or more layers of insulation components with an outer shell, two or more layers of insulation components with an outer shell, and or fourth or more layers of insulation components with an outer shell. With reach of these embodiments, the outer shell may include one or more layer of materials, such as metals, and/or insulation disposed between or external to the layers.

These insulation components may be formed into bricks or castables having a plurality of rows and utilized to surround the process-flow components. The purpose of the insulation components is to protect the reactor's shell from temperature variation, retain the processes core temperatures within the reactor or a combination of providing both temperature and erosion protection to the shell, which may be metallic. The shell lining thicknesses can range from several inches to feet depending on its intended service.

V. Operation in a Regenerative Reverse-Flow Pyrolysis Reactor

In one or more embodiments of the present techniques, various reactors and methods may be utilized. For instance, the reactors and methods may include those described in patent applications, such as U.S. Pat. No. 7,815,873 and U.S. Patent Application Publication Nos. 2007-0191664, 2009-0008292, 2008-0300438, 2010-0126907, and 2010-0130803, which are each incorporated herein by reference. These patent and patent applications teach and disclose various apparatus and methods for pyrolyzing hydrocarbon feeds in reverse flow regenerative pyrolysis reactors, including deferred combustion and controlled heat positioning processes.

As an embodiment, a hydrocarbon conversion method is described. The method includes providing a reactor having a process-flow component and an insulation component adjacent to the process-flow component; wherein the insulation component comprises an oxide, the oxide having: i) a bulk thermal conductivity in the dense phase ≤5 W/m·K at temperatures in the range of 800° C. to 1600° C.; ii) a porosity of ≥30 vol %; iii) a melting point of no less than 2060° C.; and iv) which remains in oxide form when: a) exposed to a first gas at a first temperature, the first gas having i) an oxygen partial pressure of $1 \times 10^{-15}$ bar, and ii) a carbon partial pressure greater than that at which zirconium oxide changes phase to zirconium carbide at the first temperature; wherein the first temperature is less than that of zirconium's triple point at the oxygen partial pressure and/or b) exposed to a second gas having an oxygen partial pressure at a second temperature, the second temperature being greater than or equal to that of zirconium triple point at the oxygen partial pressure; and exposing a pyrolysis feed to thermal pyrolysis at a peak pyrolysis gas temperature ≥1400.0° C. to produce a reactor product that comprises $C_2$ unsaturates. The reactor product has a $C_3^+$ to acetylene weight ratio is ≤0.45. The pyrolysis feed comprises hydrocarbon, and wherein the pyrolysis feed has a hydrogen ($H_2$) gas to carbon (carbon atoms in feed hydrocarbon molecules) molar ratio in the range of 0.1 to 5.

The method may also include other steps or specific operating conditions. For instance, at least a portion of the reactor product may be converted into ethylene, which may be performed via polymerization. To enhance the conversion of the pyrolysis feed, the operating conditions may be adjusted to further enhance the process. For instance, the peak pyrolysis gas temperature is in the range of 1540.0° C. to 2200.0° C., and wherein the exposing is for a residence time in the range from 0.5 seconds to 0.001 seconds. In yet another embodiment, the peak pyrolysis gas temperature is in the range of 1600.0° C. to 1800.0° C., and wherein the exposing is for a residence time in the range from 0.5 seconds to 0.001 seconds. In other embodiments, the pressure is in the range of 44 psig (303 kPag) to 300 psig (2068 kPag), or even in the range of 103 psig (710 kPag) to 163 psig (1124 kPag).

To provide heat to the process-flow components, various heating steps may be performed. For instance, a combustion feed, which may include two different reactants, such as fuel and oxidant, may be introduced into the reactor. These reactants may exothermically react to produce combustion products and to provide heat to the process-flow components; and then the combustion products may be conducted away from the reactor. In certain embodiment, the reactants, such as the fuel and oxidant, are separately heated within the regenerative reverse flow reactor prior to exothermically reacting in the region.

Other embodiments are described in the following paragraphs:

1. A hydrocarbon pyrolysis reactor, the reactor comprising: a process-flow component and an insulation component adjacent to the process-flow component; wherein the insulation component comprises an oxide, the oxide having: i) a bulk thermal conductivity in the dense phase ≤5 W/m·K at temperatures in the range of 800° C. to 1600° C.; ii) a porosity of ≥30 vol % based on the volume of the insulation component; iii) a melting point of no less than 2060° C.; and iv) which remains in oxide form when: a) exposed to a first gas at a first temperature, the first gas having i) an oxygen partial pressure of $1 \times 10^{-15}$ bar and ii) a carbon partial pressure greater than that at which zirconium oxide changes phase to zirconium carbide at the first temperature; wherein the first temperature is less than that of zirconium's triple point at the oxygen partial pressure; and/or b) exposed to a second gas having an oxygen partial pressure at a second temperature, the second temperature being greater than or equal to that of zirconium triple point at the oxygen partial pressure.

2. The hydrocarbon pyrolysis reactor of paragraph 1, wherein the process-flow component has a porosity in the range of 1 vol % and 28 vol % based on the volume of the process-flow component, and the insulation component has a porosity in the range of 30 vol % and 75 vol % based on the volume of the insulation component.

3. The hydrocarbon pyrolysis reactor of any of paragraphs 1 to 2, wherein the insulation component has a porosity in the range of 30 vol % and 75 vol %, based on the volume of the insulation component.

4. The hydrocarbon pyrolysis reactor of any of paragraphs 1 to 2, wherein the insulation component has a porosity in the range of 30 vol % and 50 vol %, based on the volume of the insulation component.

5. The hydrocarbon pyrolysis reactor of any of paragraphs 1 to 2, wherein the insulation component has a porosity in the range of 50 vol % and 75 vol %, based on the volume of the insulation component.

6. The hydrocarbon pyrolysis reactor of any of paragraphs 1 to 5, wherein the insulation component has a bulk thermal conductivity in the dense phase ≤4 W/m·K when the insulation component has a temperature in the range of 800° C. to 1600° C.

7. The hydrocarbon pyrolysis reactor of any of paragraphs 1 to 5, wherein the insulation component has a bulk thermal conductivity in the dense phase ≤2 W/m·K when the insulation component has a temperature in the range of 800° C. to 1600° C.

8. The hydrocarbon pyrolysis reactor of any of paragraphs 1 to 7, wherein the insulation component has emissivity in the dense phase 0.35 at 1000° C.

9. The hydrocarbon pyrolysis reactor of any of paragraphs 1 to 7, wherein the insulation component has emissivity in the dense phase 0.30 at 1000° C.

10. The hydrocarbon pyrolysis reactor of any one of paragraphs 1 to 9, wherein the insulation component has a composition of greater than 90 wt % yttria based on the weight of the insulation component.

11. The hydrocarbon pyrolysis reactor of any one of paragraphs 1 to 10, wherein the insulation component comprises a first surface and a second surface, wherein the second surface has a porosity >2% larger than the first surface.

12. The hydrocarbon pyrolysis reactor of any one of paragraphs 1 to 10, wherein the insulation component comprises a first surface and a second surface, wherein the second surface has a thermal conductivity >2% larger than the first surface.

13. The hydrocarbon pyrolysis reactor of any one of paragraphs 1 to 10, wherein the insulation component comprises a first surface and a second surface, wherein the second surface has an emissivity >2% larger than the first surface.

14. The hydrocarbon pyrolysis reactor of any one of paragraphs 1 to 13, wherein insulation component remains in oxide form when exposed to a gas having carbon partial pressure of $10^{-11}$ bar, an oxygen partial pressure of $10^{-15}$ bar, at a temperature of 2050° C.

15. The hydrocarbon pyrolysis reactor of any one of paragraphs 1 to 14, wherein the hydrocarbon pyrolysis reactor comprises at least one thermal pyrolysis reactor.

16. The hydrocarbon pyrolysis reactor of any one of paragraphs 1 to 14, wherein the hydrocarbon pyrolysis reactor comprises at least one reverse-flow regenerative reactor.

17. The hydrocarbon pyrolysis reactor of any one of paragraphs 1 to 16, wherein the insulation component has a melting point of no less than 2160° C.

18. The hydrocarbon pyrolysis reactor of any one of paragraphs 1 to 17, wherein the insulation component comprises a plurality of insulation bricks, wherein the insulation bricks comprises at least one of yttria, an yttrium containing compound, and combinations thereof.

19. The hydrocarbon pyrolysis reactor of any one of paragraphs 1 to 17, wherein the insulation component comprises a plurality of insulation bricks, wherein at least one of the plurality of insulation bricks comprises >50 wt % yttria and at least one of the yttria-containing insulation bricks further comprises one or more of zirconium, alumina and combinations thereof.

20. The hydrocarbon pyrolysis reactor of any one of paragraphs 18 to 19, further comprising a fluid barrier layer having a porosity in the range of 0% to 10% disposed between the plurality of insulation bricks and the process-flow component.

21. The hydrocarbon pyrolysis reactor of any one of paragraphs 18 to 20, further comprising an outer shell comprising steel disposed between the plurality of insulation bricks and a location external to the reactor.

22. The hydrocarbon pyrolysis reactor of paragraph 21, wherein the plurality of insulation bricks are configured to form two or more layers between the process-flow component and the outer shell.

23. The hydrocarbon pyrolysis reactor of any one of paragraphs 1 to 22, wherein the process-flow component is one or more of a reaction fluid mixer, a honeycomb monolith, a reactor bed, a reactor conduit, and a reactant mixer.

24. The hydrocarbon pyrolysis reactor of any one of paragraphs 1 to 23, wherein the insulation component comprises from 0.001 wt % to 5 wt % based upon the weight of the insulation component of compounds that comprise elements selected from the group consisting of Al, Si, Mg, Ca, Fe, Mn, Ni, Co, Cr, Ti, Hf, V, Nb, Ta, Mo, W, Sc, La, and Ce, and mixtures thereof 25. A hydrocarbon conversion method comprising:
   providing a reactor having a process-flow component and an insulation component adjacent to the process-flow component; wherein the insulation component comprises an oxide, the oxide having:
   i) a bulk thermal conductivity in the dense phase ≤5 W/m·K at temperatures in the range of 800° C. to 1600° C.;
   ii) a porosity of ≥30 vol % based on the volume of the insulation component;
   iii) a melting point of no less than 2060° C.; and
   iv) which remains in oxide form when:
      a) exposed to a first gas at a first temperature, the first gas having:
         i) an oxygen partial pressure of $1 \times 10^{-15}$ bar, and
         ii) a carbon partial pressure greater than that at which zirconium oxide changes phase to zirconium carbide at the first temperature; wherein the first temperature is less than that of zirconium's triple point at the oxygen partial pressure; and/or
      b) exposed to a second gas having an oxygen partial pressure at a second temperature, the second temperature being greater than or equal to that of zirconium triple point at the oxygen partial pressure; and
   exposing a pyrolysis feed to thermal pyrolysis at a peak pyrolysis gas temperature ≥1400.0° C. to produce a reactor product that comprises $C_2$ unsaturates.

26. The method of paragraph 25, wherein the reactor product has a $C_3^+$ to acetylene weight ratio is ≤0.45.

27. The method of any one of paragraphs 25 to 26, wherein the pyrolysis feed comprises >10 wt % hydrocarbon based on the total weight of the pyrolysis feed, and wherein the pyrolysis feed has a hydrogen ($H_2$) gas to carbon (carbon atoms in feed hydrocarbon molecules) molar ratio in the range of 0.1 to 5.

28. The method of any one of paragraphs 25 to 27, further comprising polymerizing at least a portion of the reactor product into ethylene.

29. The method of any one of paragraphs 25 to 28, further comprising: introducing a combustion feed to the reactor; reacting the combustion feed to produce combustion products and to provide heat to the process-flow component; and conducting away the combustion products from the reactor.

30. The method of paragraph 29, wherein the combustion feed comprise a fuel and oxidant that are separately heated within the regenerative reverse flow reactor prior to exothermically reacting in the region.

31. The method of any one of paragraphs 25 to 30, wherein the peak pyrolysis gas temperature is in the range of 1540.0° C. to 2200.0° C., and wherein the exposing is for a residence time in the range from 0.5 seconds to 0.001 seconds.

32. The method of any one of paragraphs 25 to 30, wherein the peak pyrolysis gas temperature is in the range of 1600.0° C. to 1800.0° C., and wherein the exposing is for a residence time in the range from 0.5 seconds to 0.001 seconds.

33. The method of any one of paragraphs 25 to 31, wherein the pressure is in the range of 44 psig (303 kPag) to 300 psig (2068 kPag).

34. The method of any one of paragraphs 25 to 31, wherein the pressure is in the range of 103 psig (710 kPag) to 163 psig (1124 kPag).

35. A regenerative reactor system comprising: a first reactor bed and a second reactor bed in flow communication with the first reactor bed, at least one insulation layer adjacent to the first reactor bed and a second reactor bed; wherein the insulation layer has a bulk thermal conductivity in the dense phase ≤5 W/m·K at temperatures in the range of 800° C. to 1600° C. or porosity in the range of 30% and 75% based on the volume of the insulation layer.

36. The hydrocarbon pyrolysis reactor of paragraph 34, wherein the at least one insulation layer comprises a plurality of insulation bricks disposed between an outer shell and the first reactor bed and the second reactor bed.

37. The hydrocarbon pyrolysis reactor of paragraph 35, wherein at least one of the plurality of insulation bricks comprise >70 wt % yttria and at least one of the yttria-containing insulation bricks comprise one or more of zirconium, alumina and combinations thereof.

38. The hydrocarbon pyrolysis reactor of any one of paragraphs 34 to 36, further comprising a fluid barrier layer disposed between the at least one insulation layer and the first reactor bed and the second reactor bed, wherein the fluid barrier layer has porosity in the range of 0% to 10% based on the volume of the fluid barrier layer.

39. The hydrocarbon pyrolysis reactor of any one of paragraphs 36 to 37, wherein the outer shell comprising >50 wt % carbon steel.

40. The hydrocarbon pyrolysis reactor of paragraphs 34 to 38, wherein the plurality of insulation bricks are configured to form two or more layers between of first reactor bed and the second reactor bed and the outer shell.

41. A hydrocarbon conversion method comprising:
   providing a reactor having a process-flow component and an insulation component adjacent to the process-flow component; wherein the insulation component comprises an oxide, the oxide having:
   i) a bulk thermal conductivity in the dense phase ≤5 W/m·K at temperatures in the range of 800° C. to 1600° C.;
   ii) a porosity of ≥30 vol % based on the volume of the insulation component;
   iii) a melting point of no less than 2060° C.; and
   iv) which remains in oxide form when:
      a) exposed to a first gas at a first temperature, the first gas having:
         i) an oxygen partial pressure of $1 \times 10^{-15}$ bar, and
         ii) a carbon partial pressure greater than that at which zirconium oxide changes phase to zirconium carbide at the first temperature;
         wherein the first temperature is less than that of zirconium's triple point at the oxygen partial pressure; and/or
      b) exposed to a second gas having an oxygen partial pressure at a second temperature, the second temperature being greater than or equal to that of zirconium triple point at the oxygen partial pressure; and
   exposing a pyrolysis feed to thermal pyrolysis at a peak pyrolysis gas temperature ≥1400.0° C. to produce a reactor product that comprises $C_2$ unsaturates.

42. The method of paragraph 41, wherein the reactor product has a $C_3^+$ to acetylene weight ratio is ≤0.45.

43. The method of any one of paragraphs 41 to 42, wherein the pyrolysis feed comprises >10 wt % hydrocarbon based on the total weight of the pyrolysis feed, and wherein the pyrolysis feed has a hydrogen ($H_2$) gas to carbon (carbon atoms in feed hydrocarbon molecules) molar ratio in the range of 0.1 to 5.

44. The method of any one of paragraphs 41 to 43, further comprising polymerizing at least a portion of the reactor product into ethylene.

45. The method of any one of paragraphs 41 to 44, further comprising:
introducing a combustion feed to the reactor;
reacting the combustion feed to produce combustion products and to provide heat to the process-flow component; and
conducting away the combustion products from the reactor.

46. The method of paragraph 45, wherein the combustion feed comprise a fuel and oxidant that are separately heated within the regenerative reverse flow reactor prior to exothermically reacting in the region.

47. The method of any one of paragraphs 41 to 46, wherein the peak pyrolysis gas temperature is in the range of 1540.0° C. to 2200.0° C., and wherein the exposing is for a residence time in the range from 0.5 seconds to 0.001 seconds.

48. The method of any one of paragraphs 41 to 46, wherein the peak pyrolysis gas temperature is in the range of 1600.0° C. to 1800.0° C., and wherein the exposing is for a residence time in the range from 0.5 seconds to 0.001 seconds.

49. The method of any one of paragraphs 41 to 48, wherein the pressure is in the range of 44 psig (303 kPag) to 300 psig (2068 kPag).

50. The method of any one of paragraphs 41 to 48, wherein the pressure is in the range of 103 psig (710 kPag) to 163 psig (1124 kPag).

51. A regenerative reactor system comprising:
a first reactor bed and a second reactor bed in flow communication with the first reactor bed,
at least one insulation layer adjacent to the first reactor bed and a second reactor bed; wherein the insulation layer has a bulk thermal conductivity in the dense phase ≤5 W/m·K at temperatures in the range of 800° C. to 1600° C. or porosity in the range of 30% and 75%.

52. The hydrocarbon pyrolysis reactor of paragraph 51, wherein the at least one insulation layer comprises a plurality of insulation bricks disposed between an outer shell and the first reactor bed and the second reactor bed.

53. The hydrocarbon pyrolysis reactor of paragraph 52, wherein at least one of the plurality of insulation bricks comprise >70 wt % yttria and at least one of the plurality of insulation bricks comprise one or more of zirconium, alumina, and combinations thereof.

54. The hydrocarbon pyrolysis reactor of any one of paragraphs 51 to 53, further comprising a fluid barrier layer disposed between the at least one insulation layer and the first reactor bed and the second reactor bed, wherein the fluid barrier layer has porosity in the range of 0% to 10%.

55. The hydrocarbon pyrolysis reactor of any one of paragraphs 52 to 54, wherein the outer shell comprising >50 wt % carbon steel.

56. The hydrocarbon pyrolysis reactor of paragraphs 51 to 55, wherein the plurality of insulation bricks are configured to form two or more layers between of first reactor bed and the second reactor bed and the outer shell.

While the present invention has been described and illustrated with respect to certain embodiments, it is to be understood that the invention is not limited to the particulars disclosed and extends to all equivalents within the scope of the claims. Unless otherwise stated, all percentages, parts, ratios, etc. are by weight. Unless otherwise stated, a reference to a compound or component includes the compound or component by itself as well as in combination with other elements, compounds, or components, such as mixtures of compounds. Further, when an amount, concentration, or other value or parameter is given as a list of upper preferable values and lower preferable values, this is to be understood as specifically disclosing all ranges formed from any pair of an upper preferred value and a lower preferred value, regardless of whether ranges are separately disclosed.

The invention claimed is:

1. A hydrocarbon pyrolysis reactor, the reactor comprising:
a process-flow component, an insulation component adjacent to the process-flow component, a fluid barrier layer positioned between the insulation component and the process-flow component, and an outer shell positioned between the insulation component and a location external to the reactor; wherein
(A) the process flow component includes at least reactor bed having the form of a honeycomb monolith,
(B) the insulation component comprises a carburization-resistant oxide, the oxide having:
 i) a bulk thermal conductivity in the dense phase ≤5 W/mK at temperatures in the range of 800° C. to 1600° C.;
 ii) a porosity of ≥30 vol % based on the volume of the insulation component;
 iii) a melting point of no less than 2060° C.; and
 iv) which remains in oxide form when:
  a) exposed to a first gas at a first temperature, the first gas having
   i) an oxygen partial pressure of $1\times10^{-15}$ bar and
   ii) a carbon partial pressure greater than that at which zirconium oxide changes phase to zirconium carbide at the first temperature; wherein the first temperature is less than that of zirconium's triple point at the oxygen partial pressure; and/or
  b) exposed to a second gas having an oxygen partial pressure at a second temperature, the second temperature being greater than or equal to that of zirconium triple point at the oxygen partial pressure,
(C) the fluid barrier layer has a porosity in the range of 0% to 10%, and
(D) the outer shell comprises steel.

2. The hydrocarbon pyrolysis reactor of claim 1, wherein the process-flow component has a porosity in the range of 1 vol % and 28 vol % based on the volume of the process-flow component.

3. The hydrocarbon pyrolysis reactor of claim 1, wherein the insulation component has a porosity in the range of 30 vol % and 75 vol %, based on the volume of the insulation component.

4. The hydrocarbon pyrolysis reactor of claim 1, wherein the insulation component has a porosity in the range of 30 vol % and 50 vol %, based on the volume of the insulation component.

5. The hydrocarbon pyrolysis reactor of claim 1, wherein the insulation component has a porosity in the range of 50 vol % and 75 vol %, based on the volume of the insulation component.

6. The hydrocarbon pyrolysis reactor of claim 1, wherein the insulation component has a bulk thermal conductivity in the dense phase ≤4 W/mK over the temperature range of 800° C. to 1600° C.

7. The hydrocarbon pyrolysis reactor of claim 1, wherein the insulation component has a bulk thermal conductivity in the dense phase ≤2 W/mK over the temperature range of 800° C. to 1600° C.

8. The hydrocarbon pyrolysis reactor of claim 1, wherein the insulation component has emissivity in the dense phase <0.35 at 1000° C.

9. The hydrocarbon pyrolysis reactor of claim 1, wherein the insulation component has emissivity in the dense phase <0.30 at 1000° C.

10. The hydrocarbon pyrolysis reactor of claim 1, wherein the insulation component comprises ≥90 wt % yttria based on the weight of the insulation component.

11. The hydrocarbon pyrolysis reactor of claim 1, wherein the insulation component comprises a first surface and a second surface, wherein the second surface has a porosity >2% larger than that of the first surface.

12. The hydrocarbon pyrolysis reactor of claim 1, wherein the insulation component comprises a first surface and a second surface, wherein the second surface has a thermal conductivity >2% larger than that of the first surface.

13. The hydrocarbon pyrolysis reactor of claim 1, wherein the insulation component comprises a first surface and a second surface, wherein the second surface has an emissivity >2% larger than that of the first surface.

14. The hydrocarbon pyrolysis reactor of claim 1, wherein insulation component remains in oxide form when exposed to a temperature of 2050° C. in the presence of a gas having carbon partial pressure of $10^{-11}$ bar and an oxygen partial pressure of $10^{-15}$ bar.

15. The hydrocarbon pyrolysis reactor of claim 1, wherein the hydrocarbon pyrolysis reactor comprises at least one thermal pyrolysis reactor.

16. The hydrocarbon pyrolysis reactor of claim 1, wherein the hydrocarbon pyrolysis reactor comprises at least one reverse-flow regenerative reactor.

17. The hydrocarbon pyrolysis reactor of claim 1, wherein the insulation component has a melting point of no less than 2160° C.

18. The hydrocarbon pyrolysis reactor of claim 1, wherein the insulation component comprises a plurality of insulation bricks, wherein the insulation bricks comprises at least one of yttria, an yttrium containing compound, and combinations thereof.

19. The hydrocarbon pyrolysis reactor of claim 1, wherein the insulation component comprises a plurality of insulation bricks, wherein at least one of the plurality of insulation bricks comprises >50 wt % yttria and at least one of the plurality of insulation bricks comprises zirconium and/or alumina.

20. The hydrocarbon pyrolysis reactor of claim 1, wherein the plurality of insulation bricks form two or more layers between the process-flow component and the outer shell.

21. The hydrocarbon pyrolysis reactor of claim 1, wherein the process-flow component further comprises one or more of a reaction fluid mixer, a reactor conduit, or a reactant mixer.

22. The hydrocarbon pyrolysis reactor of claim 1, wherein the insulation component comprises from 0.001 wt % to 5 wt % based upon the weight of the insulation component of compounds that comprise elements selected from the group consisting of Al, Si, Mg, Ca, Fe, Mn, Ni, Co, Cr, Ti, Hf, V, Nb, Ta, Mo, W, Sc, La, Ce, and mixtures thereof.

* * * * *